United States Patent [19]

Morrison et al.

[11] Patent Number: 4,904,514

[45] Date of Patent: Feb. 27, 1990

[54] PROTECTIVE COVERING FOR A MECHANICAL LINKAGE

[75] Inventors: Robert A. Morrison, Kennesaw; Malcolm L. Johnson, East Point, both of Ga.

[73] Assignee: Kimberly-Clark Corporation, Neenah, Wis.

[21] Appl. No.: 243,876

[22] Filed: Sep. 13, 1988

[51] Int. Cl.⁴ .......................... B25J 3/00; B25J 19/00; B32B 1/04; B32B 1/08; B32B 33/00

[52] U.S. Cl. ...................................... 428/53; 414/728; 414/909; 428/36.2; 428/58; 428/60; 428/80; 428/81; 428/99; 428/102; 428/122; 428/123; 428/137; 428/171; 428/188; 428/192; 428/286; 428/288; 428/290; 428/296; 428/302; 428/409; 428/422; 901/15; 901/23; 901/25; 901/49

[58] Field of Search .............. 414/728, 909; 428/36.2, 428/53, 58, 60, 80, 81, 99, 102, 122, 123, 137, 171, 188, 192, 286, 288, 290, 296, 302, 409; 901/49

[56] References Cited

U.S. PATENT DOCUMENTS 2,861,709  11/1958  Bergsland et al. ................ 214/1
3,338,992   9/1967  Kinney ................................ 264/24
3,341,394   9/1967  Kinney ................................ 161/72
3,433,370   3/1969  Eisert et al. ....................... 214/1

(List continued on next page.)

FOREIGN PATENT DOCUMENTS 697518  11/1964  Canada ................................ 901/49
803714   1/1969  Canada ................................ 28/5
1906310  9/1970  Fed. Rep. of Germany ........ 901/49

(List continued on next page.)

OTHER PUBLICATIONS

NRL Report 4364 "Manufacture of Superfine Organic Fibers", V. A. Wente, E. L. Boone, C. D. Fluharty, May 25, 1954, U.S. Dept of Commerce.

NRL Report 5265, "An Improved Device for The Formation of Superfine Thermoplastic Fibers", K. D. Lawrence, B. F. Leekas, J. A. Young, Feb. 11, 1969, U.S. Dept. of Commerce.

Primary Examiner—James C. Cannon
Attorney, Agent, or Firm—William D. Herrick

[57] ABSTRACT

A covering for a mechanical linkage comprises a material which is substantially impermeable to both liquid and particle contaminants and conforms to the outer surface of the mechanical linkage. Because the covering conforms to the surface of the mechanical linkage, the covering does not have loose portions that billow and rub together as the mechanical linkage operates. This lessens the possibility of pieces of the covering and contaminating material detaching and falling from the mechanical linkage. The covering also comprises access openings whereby the mechanical linkage can be serviced without removing the entire covering. In a preferred embodiment, the covering comprises a plurality of sections, each section having fasteners for securing the sections about the mechanical linkage. The separate sections can be individually removed and replaced in a relatively short period of time. In a more preferred embodiment, the covers comprise a non-woven polymeric fabric which is a barrier to industrial coatings and finishes such as paint. The non-woven fabric comprises a central layer of melt-blown polymer fibers placed between and bonded to two layers of spunbonded polymeric fibers. The outer layer of spunbonded polymeric fibers is preferably calendered to prevent linting and bonded to resist abrasion. The outer layer of the cover comprises a fluorocarbon as a barrier to industrial coatings and finishes and an inorganic salt to prevent static electricity buildup on the outer layer. In addition, the polymeric fibers of the outer layer preferably have a non-white color which is distinctive from the color of the polymeric fibers of the inner layer so that the outer layer is distinguishable from the inner layer and any fibers from the outer layer that might detach from the covering during operation of the mechanical linkage are identifiable. The covers are particularly suited for protecting spraypainting robots from incident paint or varnish spray.

36 Claims, 20 Drawing Sheets

U.S. PATENT DOCUMENTS

| | | |
|---|---|---|
| 3,502,538 | 3/1970 | Petersen . |
| 3,502,763 | 3/1970 | Hartmann ............................ 264/210 |
| 3,542,615 | 11/1970 | Dobo et al. ......................... 156/181 |
| 3,692,618 | 9/1972 | Dorschner . |
| 3,849,241 | 11/1974 | Buten et al. . |
| 3,855,046 | 12/1974 | Hansen et al. . |
| 3,909,009 | 9/1975 | Cvetko et al. ........................ 274/37 |
| 4,041,203 | 8/1977 | Brock et al. ......................... 428/157 |
| 4,115,605 | 9/1978 | Hultman et al. .................... 427/377 |
| 4,340,563 | 7/1982 | Appel et al. ......................... 264/518 |
| 4,374,888 | 2/1983 | Bornslaeger ........................ 428/198 |

FOREIGN PATENT DOCUMENTS

| | | |
|---|---|---|
| 3003748 | 8/1980 | Fed. Rep. of Germany ........ 901/49 |
| 1248526 | 11/1960 | France .................................. 901/49 |
| 1235446 | 10/1986 | Japan .................................... 901/49 |
| 444635 | 10/1974 | U.S.S.R. . |
| 445568 | 11/1974 | U.S.S.R. .............................. 901/49 |
| 889178 | 2/1962 | United Kingdom ................. 901/49 |
| 968525 | 9/1964 | United Kingdom ................. 901/49 |
| 1210898 | 11/1970 | United Kingdom ................. 901/49 |
| 1589696 | 10/1977 | United Kingdom . |
| 2038772 | 7/1980 | United Kingdom ................. 901/49 |

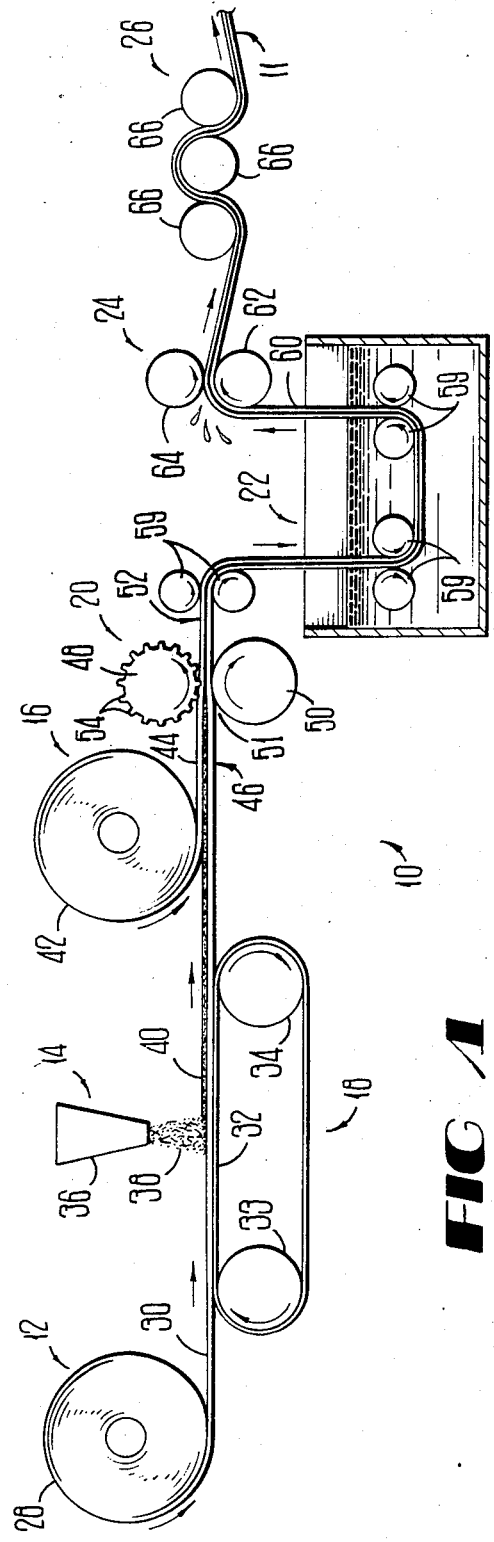

PROTECTIVE COVERING FOR A MECHANICAL LINKAGE

TECHNICAL FIELD

The present invention relates in general to a protective covering for a mechanical linkage, and more particularly relates to a protective covering for a mechanical linkage of a spray painting robot.

BACKGROUND OF THE INVENTION

Many mechanical devices employ one or more mechanical linkages. To operate properly, the pivot point of a mechanical linkage must be kept free of contaminants that collect thereon and inhibit movement of the linkage. One example of such a device is a robot that applies industrial coatings and finishes such as paint, varnish, lacquer and the like. Incident paint or finish spray tends to settle about the pivot points of the mechanical linkages of the robot, thereby inhibiting movement of the robot. The incident spray can also settle on internal parts of the robot and inhibit the operation of those internal parts. In addition, the settled incident spray eventually becomes an unsightly cake on the outside of the robot. To remove the settled incident spray, it must be scraped or washed off with a solvent.

To solve the above problems, the mechanical linkages of robots and other such devices were covered with loose-fitting fabrics, aluminum foil, plastic sheeting, paper and the like, and fastened with tape. However, these prior art covers are not totally effective as a barrier to the incident spray or other contaminants. The prior art covers do not completely cover the mechanical linkages of the robot. Normally, the prior art covers are simply wrapped around the robot and fastened to the robot with tape. There are often gaps left in the covers when the covers are fastened to the robot. In addition, during operation of the robot, the covers are stretched and twisted as the mechanical linkages of the robot extend and turn. As a result, the fastening tape and the covering materials are torn apart leaving gaps in the covers. Also, during movement of the mechanical linkages, the covers rub together causing pieces of the caked spray and covering to break off, fall and contaminate the coating or finishing job being performed by the robot. This problem is particularly severe when the prior art covers are loose fitting. The loose fitting covers billow as the mechanical linkage moves and the folds of the billows rub together. Further, the industrial coatings and finishes which collect on the prior art covers also tend to "run-off" or drip from the covers onto the coating or finishing job being performed by the robot.

Another problem with the prior art covers is the lengthy installation time. It generally takes greater than one hour to install the prior art covers. The installation time takes up valuable operation time. If the robot requires repair, the cover must be taken off and then replaced, thereby adding at least one hour to the down time of the robot during maintenance.

Therefore, there is a need for a durable covering for mechanical linkages that acts as a barrier to liquid and particle contaminants and at the same time is fast and simple to install.

SUMMARY OF THE INVENTION

Generally described, the present invention solves the above-described problems in the prior art by providing a covering for a mechanical linkage, the covering comprising a material which is substantially impermeable to both liquid and particle contaminants and conforming to the outer surface of the mechanical linkage. Because the covering conforms to the surface of the mechanical linkage, the covering does not have loose portions that billow and rub together as the mechanical linkage operates. This lessens the possibility of pieces of the coverings and contaminating material detaching and falling from the mechanical linkage.

Stated somewhat more particularly, the covering of the present invention comprises access openings whereby the mechanical linkage can be serviced without removing the entire covering. Because the covering does not have to be removed for maintenance procedures, the down time of the covered device is reduced. Even more particularly, the protective material of the present invention comprises a plurality of sections, each section having fasteners for securing the sections about the mechanical linkage. Because the covering is in sections, the entire covering does not have to be replaced at one time. The fasteners allow the sections to be individually removed and replaced in a relatively short period of time.

Stated even more particularly, the present invention comprises a non-woven polymeric fabric which is a barrier to industrial coatings and finishes such as paint, varnish, lacquer and the like. The non-woven fabric comprises a central layer of melt-blown polymeric fibers placed between and bonded to two layers of spun-bonded polymeric fibers. The outer layer of spun-bonded polymeric fibers is calendered to prevent linting and has a bonding pattern whereby 25–30% of the outer layer is compressed so that the outer layer resists abrasion. The outer layer of non-woven polymeric fabric tends to hold the industrial coatings and finishes so that the coatings and finishes do not run-off of the covering. A surface coating on the outer layer comprises a fluorocarbon as a barrier to industrial coatings and finishes and an inorganic salt to prevent static electricity buildup on the outer layer. In addition, the polymeric fibers of the outer layer have a non-white color which is distinctive from the color of the polymeric fibers of the inner layer so that the outer layer is distinguishable from the inner layer and any fibers from the outer layer that might come off of the covering during operation of the mechanical linkage are identifiable.

Therefore, it is an object of the present invention to provide an improved protective covering for a mechanical linkage.

It is another object of the present invention to provide an improved protective covering for a mechanical linkage of a spray painting robot.

It is another object of the present invention to provide a mechanical linkage covering that is a barrier to industrial coatings and finishes and reduces run-off of those industrial coatings and finishes.

It is another object of the present invention to provide a mechanical linkage covering that is substantially lint free.

It is another object of the present invention to provide a mechanical linkage covering that is abrasion resistant.

It is another object of the present invention to provide a mechanical linkage covering that incurs less static electric buildup.

It is a further object of the present invention to provide a mechanical linkage covering that does not billow.

It is still a further object of the present invention to provide a mechanical linkage covering that covers the entire linkage.

It is an even further object of the present invention to provide a mechanical linkage covering that is fast and easy to install.

It is still a further object of the present invention to provide a mechanical linkage covering that allows quick access to repair the mechanical linkage.

Other objects, features and advantages will become apparent from reading the following specifications in conjunction with the accompanying drawings.

BRIEF DESCRIPTION OF THE DRAWINGS

FIG. 1 is an illustration of the process for producing the non-woven fabrics used in the present invention.

FIGS. 2 and 3 are sectional details of non-woven fabrics used in the present invention.

Figure 4:
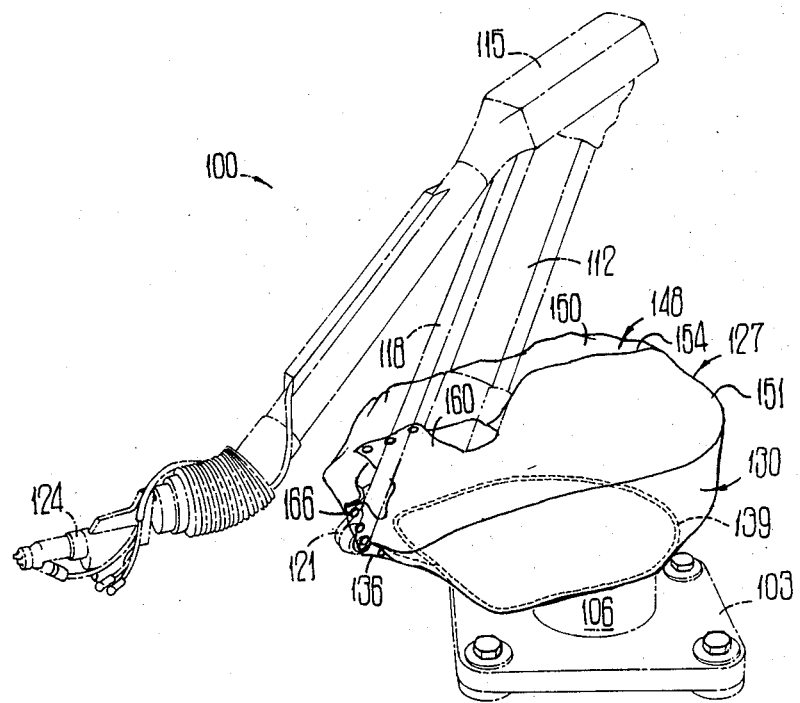

FIG. groups 5-4, 7-6, 9-8, 11-10, 13-12, 15-14, 17-16, 19-18, 21-20, 23-22, 25-24, 27-26, 29-28, 31-30, 33-32, 35-34, 37-36, 39-38, and 41-40 show, respectively, per se views of specific protective covers encompassed by the present invention and said protective covers in assembled association about specific mechanical linkages.

DETAILED DESCRIPTION

Non Woven Laminate

Turning first to FIG. 1, there is schematically illustrated a process line 10 for the manufacture of the non-woven laminate 11 of the disclosed embodiments of the present invention. The process line includes an inner layer unwind station 12, a central layer melt blowing station 14, an outer layer unwind station 16, a conveyor 18, a bonding station 20, a treatment bath 22, a ringer station 24, and a drying station 26.

The inner layer unwind station 12 comprises a roll 28 of spunbonded fabric. An inner layer of spunbonded fabric 30 is unwound from the roll 28 onto a conveyor belt 32 mounted on rollers 33 and 34. As the inner layer of spunbonded fabric 30 travels along the conveyor belt 32, melt blowing head 36 deposits melt-blown fibers 38 onto the spunbonded fabric forming a central layer of melt-blown fabric 40. Next, an outer layer of spunbonded fabric 44 is unwound from outer layer unwind station 16 from a roll 42 of spunbonded fabric onto the central layer of melt-blown fabric 40.

The inner layer of spunbonded fabric 30, the central layer of melt-blown fabric 40, and the outer layer of spunbonded fabric 44 comprise an unbonded composite of fabric 46 which travels from the conveyor belt 32 through bonding rollers 48 and 50. The unbonded fabric composite 46 is compressed as it passes through the nip 51 between bonding rollers 48 and 50. Bonding roller 48 is preferably heated to a temperature substantially equal to the melting point of the outer layer of spunbonded fabric 44. The compression from bonding rolls 48 and 50 and the heat from bonding roll 48 bonds the inner layer of spunbonded fabric 30, the central layer of melt-blown fabric 40, and the outer layer of spunbonded fabric 44 together to form a 3-layer non-woven laminate 52.

Raised diamond-shaped pins 54 protruding from the outer surface of bonding roller 48 form bonding compressions 56 in the outer layer of spunbonded fabric 44. The bonding pattern formed by the raised pins 54 is best shown in FIGS. 2 and 3, and further description may be found in Hansen, et al., U.S. Pat. No. 3,855,046 incorporated herein by reference. This bonding pattern is referred to hereinafter as the "Hansen and Pennings bond pattern."

The bonded laminate 52 is next guided by guide rollers 59 through a treatment bath comprising a solution of hexanol, lithium nitrate, octanol, a fluorocarbon and water. The fluorocarbon is preferably a fluoro-chemical polymer emulsion sold under the brand name FC-808 Scotch-Ban by 3M Company of Minneapolis, Minnesota. The treatment bath preferably comprises approximately 2.68 wt. % of FC-808, 0.11 wt.% of lithium nitrate, 0.68 wt.% of hexanol and 0.3% of octanol. The remaining portion of the treatment bath preferably comprises water. The treated laminate 60 then passes through rollers 62 and 64 of wringer station 24. Pressure exerted by rollers 62 and 64 removes a substantial amount of the treatment bath 22 clinging to the treated laminate.

From the wringer station 24, the treated laminate 60 proceeds through a series of drying cans 66 which comprise the drying station 26. The drying cans 66 are heated so the treated laminate 60 is dried as the treated laminate passes through the drying station 26.

The dried laminate 11 is then calendered in the same or in a separate process line by passing the laminate through the nip of a pair of smooth calendering rollers. The roller in contact with the outer layer 44 of spunbonded fabric is heated, preferably to a temperature substantially equal to the melting point of the outer layer of spunbonded fabric. For more rapid calendering of the laminate, a second pair of calendering rollers can be used in series with the first pair of calendering rollers. The smooth calendering enhances the abrasion resistance of the outer layer 44 and reduces the amount of lint which detaches from the outer layer. These advantages are discussed in more detail hereinafter.

The spunbonded fabric of inner layer 30 and outer layer 44 is prepared in conventional fashion such as illustrated by the following patents: Appel et al. U.S. Pat. No. 4,340,563; Dorschner et al. U.S. Pat. No. 3,692,618; Kinney U.S. Pat. Nos. 3,338,992 and 3,341,394; Levy U.S. Pat. No. 3,502,538; Hartmann U.S. Pat. Nos. 3,502,763 and 3,909,009; Dobo, et al. U.S. Pat. No. 3,542,615; and Harmon Canadian Pat. No. 803,714. Spunbonded materials prepared with continuous filaments generally have at least three common features. First the polymer is continuously extruded through a spinneret to form discrete filaments. Thereafter, the filaments are drawn either mechanically or pneumatically without breaking in order to molecularly orient the polymer filaments and achieve tenacity. Lastly, the continuous filaments are deposited in a substantially random manner onto a carrier belt to form the spunbonded fabric. The 3-layer non-woven laminate 11 can alternatively be produced by depositing the thermoplastic polymer filaments directly onto the conveyor belt 32 to form the inner layer of spunbonded fabric 30 and on top of the central layer of melt-blown fabric 40 to form the outer layer of spunbonded fabric 44.

The central layer of melt-blown fabric 40 is formed by extruding a molten thermoplastic polymer into fine streams which are broken up by a flow of high velocity heated gas into discontinuous fibers of small diameter. The discontinuous melt-blown fibers 38 are deposited through melt-blowing head 36 onto the inner layer of spunbonded fabric 30. The construction and operation of the melt-blowing station 14 for forming microfibers 38 and layer 30 is considered conventional, and the design and operation are well within the skill of those of ordinary skill in the art. Such skill is demonstrated by NRL Report 4364, "Manufacture of Super-Fine Organic Fibers", by V. A. Wendt, E. L. Boon, and C. D. Fluharty; NRL Report 5265, "An Improved Device for the Formation of Super-Fine Thermoplastic Fibers", by K. D. Lawrence, R. T. Lukas, and J. A. Young; and U.S. Pat. No. 3,849,241, issued Nov. 19, 1974 to Buntin, et al.

The fibers that form the spunbonded fabric and the melt-blown fabric can be made from a wide variety of thermoplastic polymers and combinations of those polymers. It is preferable to use polypropylene to practice the present invention because of the high strength quality and low cost of polypropylene.

Several physical attributes of the 3-layer non-woven laminate make the laminate effective as a covering material for mechanical linkages, and in particular as a covering material for a spray-painting robot. First, the 3-layer non-woven laminate (hereinafter referred to as SMS laminate) is a barrier to industrial coatings and finishes such as paint and laquer. The ability of the SMS laminate to repel the industrial coatings and finishes is enhanced by the fluorocarbon, FC-808, in the treatment bath. Accordingly, the SMS laminate is effective in protecting the mechanical linkages of a robot or other mechanical device from incidental coating and finish spray.

Other physical attributes of the SMS laminate are high tear and tensile strength. These are qualities which are necessary to endure the wear caused by the movement of the mechanical linkage. The basis weight (ounces of fabric per square yard of fabric) of the SMS laminate affects the tear and tensile strength of the SMS laminate. The basis weight of the SMS laminate is preferably between 1.4 and 2.2 ounces per square yard and more preferably 1.8 ounces per square yard. The higher basis weight results in greater tear and tensile strength of the SMS laminate while a lower basis weight results in a less costly laminate. The preferred basis weight for each layer of the SMS laminate is approximately 0.6 ounces per square yard.

Another attribute of the SMS laminate is abrasion resistance. Abrasion tends to cause the fibers of the outer surface of laminates to "fuzz". This fuzz can eventually fall off the laminate and contaminate the surroundings. The abrasion resistance of the SMS laminate is enhanced by the bonding pattern of the SMS laminate and the smooth calendering. The bonding pattern preferably produced by the raised pins on the bonding roller is the regular Hansen and Pennings bond pattern. Each pin on the bonding roller produces a compression in the outer surface of the SMS laminate. The area of the outer surface of the SMS laminate that is compressed by each pin is called the pin area. The sum of the pin areas is called the bond area. For proper abrasion resistance of the SMS laminate, it is preferable that the bond area comprise 25 to 30% of the total area of the outer surface of the SMS laminate and the individual pin area equal substantially about 0.0009 square inches.

A particularly surprising attribute of the SMS laminate is the ability to hold industrial coatings and finishes so that any coatings and finishes which collect on the laminate do not run-off the laminate. The bond pattern of the SMS laminate increases the ability of the SMS laminates to hold the coating and finishing materials. This attribute is especially advantageous when the SMS laminate is used to cover spray painting robots. The SMS laminate reduces the likelihood of the coating and finishing material from running off the covering and contaminating the coating or finishing job being performed by the robot.

Still another attribute of the SMS laminate is that the outer surface of the SMS laminate is substantially lint free. Consequently, the SMS laminate does not contaminate the surroundings with lint particles. The outer layer of the SMS laminate is calendered to substantially eliminate linting. The outer layer of spunbonded fabric is calendered by the heat and pressure of the calendering rollers. The preferred temperature of the heated calendering roller is approximately 320°–340° F., the preferred pressure exerted by the calendering rollers is 355 pli, and the preferred speed of the SMS laminate through the rollers is 100 ft. per minute. The heat from the heated calendering roller further bonds the fibers in the outer layer of spunbonded fabric together, thereby preventing those fibers from detaching from the laminate.

A further attribute of the SMS laminate is the conductivity of the outer surface of the SMS laminate. Because of this conductivity, electric charges do not build up on the outer surface of the SMS laminate. The lithium nitrate in the treatment bath increases the conductivity of the outer layer of spunbonded fabric and thus reduces the buildup of static electric charge thereon. The treatment bath results in a dry add-on (as a percentage of the laminate weight) of 21.5% of FC-808 and 0.043% for the lithium nitrate.

A particularly advantageous aspect of the SMS laminate is achieved by coloration of the outer layer of spunbonded fabric. The outer layer of spunbonded fabric is preferably tinted yellow with Ampacet yellow pigment 43307. The inner layer of spunbonded fabric is a distinct color from the outer layer of spunbonded fabric. The inner layer of spunbonded fabric is preferably tinted with Ampacet white pigment 41438. The distinctive color of the outer layer of spunbonded fabric serves to identify the outer layer of spunbonded fabric so that the mechanical linkage or robot covers made from the SMS laminate will be manufactured with the yellow or abrasion resistant side oriented to the outside of the cover. The yellow tint also ensures that the end user of the cover will install the cover with the abrasion resistant side out. The yellow tint of the outside layer of spunbonded fabric also serves to identify any fibers that come loose from the outer layer of the laminate. For example, when the SMS laminate is used for a spray-painting robot cover, any yellow fibers that may come loose from the cover and contaminate the painted surfaces can easily be identified and removed.

The characteristic of the SMS laminate produced according to this disclosure are illustrated by the following examples.

EXAMPLE 1

A three-layer polypropylene laminate was made according to the process disclosed herein. The inner layer of spunbonded polypropylene fabric had a basis weight of 0.6 ounces per square inch and was whitened with Ampacet white pigment 41438. The central layer of melt-blown polypropylene fabric had a basis weight of 0.6 ounces per square inch and was tinted with Ampacet yellow pigment 43307. The outer layer of spunbonded polypropylene fabric also had a basis weight of 0.6 ounces per square inch and was tinted with Ampacet yellow pigment 43307. The laminate was bonded using the regular Hansen and Pennings bond pattern with a bond area of 30%. The laminate was passed between the bonding rollers at a rate of 580 feet per minute while the temperature of the bonding roller contacting the outer layer of the laminate was about 320° F. and the pressure exerted by the bonding rollers on the laminate was about 1000 psi (920 pli). The polypropylene laminate was passed through a treatment bath comprising 2.68% FC-808, 0.11% lithium nitrate, 0.03% octanol, 0.68% hexanol and water as the remaining portion. The laminate was then dried and calendered on a separate process line by passing the laminate between the nip of two smooth calendering rollers. The temperature of the calendering roller contacting the outer layer of the laminate was 333° F. and the pressure exerted by the calendering rollers was 355 pli. The dried and calendered laminate was then subjected to several tests, the results of which are shown in Table 1.

TABLE 1

| Characteristic | Unit of Measurement | Average | Standard Derivation |
|---|---|---|---|
| basis weight | oz/yd$^2$ | 1.89 | 0.093 |
| 5" bulk thickness | in | 0.012 | 0.0006 |
| trap tear md | lbs. | 4.03 | 0.85 |
| cd | lbs. | 3.47 | 0.63 |
| grab tensile md | lbs | 22.02 | 2.16 |
| cd | lbs. | 21.81 | 3.47 |
| drape stiff md | cm | 4.78 | 0.43 |
| cd | cm | 2.41 | 0.435 |
| alcohol repellency | | 3.5 | 0 |
| spray impact penetration | grams | 0.166 | 0.066 |
| static decay | sec | 0.03 | 0 |
| hydrohead | cm | 37.5 | 7.2 |
| mullen burst | psi | 30.2 | 2.38 |
| porosity | cfm | 4.46 | 0.593 |
| friction | md, static | 0.241 | 0.031 |
| | md, dynamic | 0.094 | 0.006 |
| lint 10 u | No. of particles | 0 | 0 |
| 05 u | No. of particles | 36.4 | 24.3 |
| martindale | cycles | 4000 | na |
| | mg | 3.1 | 1.44 |

EXAMPLE 2

A three-layer polypropylene laminate was made according to example 1 above, except that the temperature of the smooth calendering roller contacting the outer layer of spunbonded fabric was 338° F. and the central and outer layers of the laminate were tinted with Ampacet white pigment 41438 instead of Ampacet yellow pigment 43307. The laminate was subjected to several tests, the results of which are shown in Table 2.

TABLE 2

| Characteristic | Unit of Measurement | Average | Standard Derivation |
|---|---|---|---|
| basis weight | oz/yd$^2$ | 1.75 | 0.146 |
| 5" bulk thickness in | | 0.013 | 0.002 |
| trap tear md | lbs. | 2.83 | 0.86 |
| cd | lbs. | 3.87 | 0.69 |
| grab tensile md | lbs | 18.94 | 3.19 |
| cd | lbs. | 21.66 | 1.36 |
| drape stiff md | cm | 3.78 | 0.54 |
| cd | cm | 4.08 | 0.38 |
| alcohol repellency | | 5 | 0 |
| spray impact | grams | 2.44 | 2.28 |

TABLE 2-continued

| Characteristic | Unit of Measurement | Average | Standard Derivation |
|---|---|---|---|
| penetration static decay | sec | 0.03 | 0 |
| hydrohead | cm | 27.8 | 10.5 |
| mullen burst | psi | 36.8 | 8.268 |
| porosity | cfm | 4.04 | 1.69 |
| friction | md, static | 0.33 | 0.028 |
| | md, dynamic | 0.197 | 0.018 |
| lint 10 u | No. of particles | 1.4 | 2.07 |
| 0.5 u | No. of particles | 37.4 | 24.17 |
| martindale | cycles | 4000 | na |
| | mg | 1.53 | 0.78 |

The drape stiffness is measured using ASTM D 1388 or FTM 1918 method 5206. The drape stiffness of the laminate is measured by pushing a sheet of the laminate over the edge of a horizontal surface. A 45° angle downward slope extends from the edge of the horizontal surface. The drape is the length of laminate beyond the edge of the horizontal surface when the leading edge of the laminate touches the 45° angle surface.

The alcohol repellency of the SMS laminate is measured by pouring a mixture of 70% isopropyl alcohol and 30% water over the outer surface of the laminate. The beading of the mixture on the outer surface of the laminate determines the alcohol repellency. Ideal beading results in a rating of 5, while a rating of 3 to 5 is satisfactory.

The penetration is measured by releasing 500 ml. of water at 80° F., one drop at a time, from 34 inches above the surface of the laminate onto the surface of the laminate. The amount of water that passes through the laminate is the penetration.

The static decay of the SMS laminate is measured in seconds with FTM 191B method 4046.

The hydrohead is measured by FTMS 191A method 5514. A column of water is forced against the surface of the laminate with static pressure. The height of the water when the water first penetrates the laminate is measured. The purpose of the hydrohead test is to find pinholes in the laminate.

The Mullen Burst is measured by forcing a metal sphere through a sheet of the SMS laminate. The pressure at which the metal sphere bursts through the laminate determines the mullen burst.

The Frazier porosity is measured by FTM 191A method 5450.

The propensity for the SMS laminate to lint is measured by the Climet Lint Test. In the Climet Lint Test fabric is bent, twisted, or crushed and the particles which shed from the fabric becomes airborne. The airborne particles are sized and counted by light pulses scattered by the particles. The results are recorded as the number of particles in 0.01 ft$^3$ of air per 37 seconds that are equal to or larger than 0.5 microns and 10 microns.

The Martindale is a measure of abrasion resistance and is measured by British Standard numbers 5690:1979 using the Martindale Abrasion Tester Model 103, as supplied by James H. Heal & Co. Ltd. of Halifax, West Yorkshire, England. Samples of the SMS laminate are run for 4000 cycles with the outer layer of the SMS laminate subjected to abrasion and the average weight loss of the samples is measured. The abrasive material used is the SMS laminate. The motion of the tester is the Standard "Lessajois" figure. The weights used are those giving loadings of 28 ounces per square inch.

Robot Covers

Figure 6:
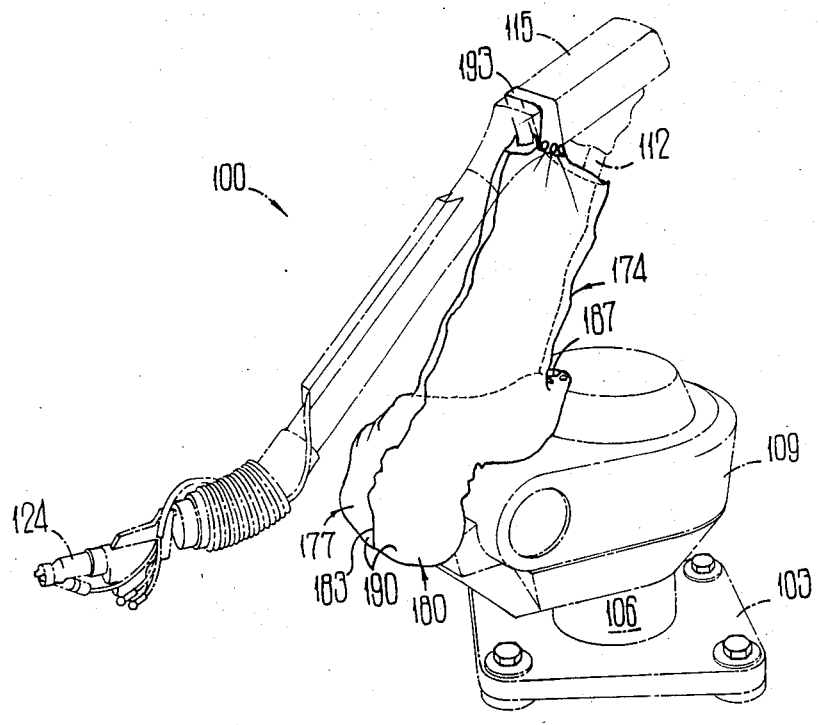
Figure 8:
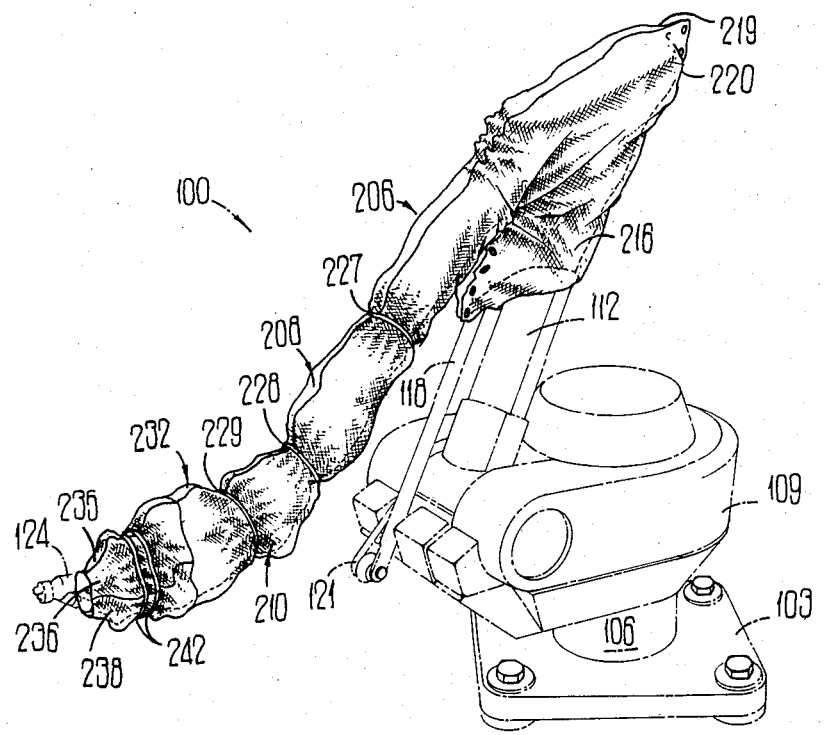

Turning to FIGS. 4, 6, and 8, a Graco OM 5000 robot (hereinafter referred to as the "Graco robot") 100 is shown. The Graco robot is typically used for spray painting automobile bodies or other objects along an assembly line and is manufactured by Graco Robotics, Inc. of Livonia, Michigan. The Graco robot 100 generally includes a substantially square anchor plate 103. A cylindric robot mount 106 is fixed to the upper surface of the anchor plate 103 and extends upwardly. A substantially oval-shaped robot base 109 is rotatably mounted upon the robot mount 106. A lower arm 112 is pivotally mounted to the forward portion of the robot base 109 and extends upwardly from the robot base to the rearward end of an upper arm 115. The upper end of the lower arm 112 is hinged to the rearward end of the upper arm 115. A vertical support rod 118 is pivotally connected at one end to the forward end 121 of the robot base 109 and extends upwardly in front of the lower arm 112 to the rearward portion of the upper arm 115. The upper end of the rod 118 is also hinged to the upper arm 115. The upper arm 115 extends forward from the lower arm 112 and the rod 118 to a spray paint nozzle 124. The spray paint nozzle 124 is pivotally attached to the forward end of the upper arm 115.

The Graco robot is capable of moving the spray paint nozzle 124 horizontally and vertically. The robot base 109 rotates about the robot mount 106 for horizontal movement of the spray paint nozzle 124. The rod 118 and the lower arm 112 are manipulated for raising, lowering, extending, and retracting the upper arm 115 and the spray paint nozzle 124. It should be understood that the Graco robot is not itself a part of the present invention and therefore is not discussed in further detail.

Figure 5:
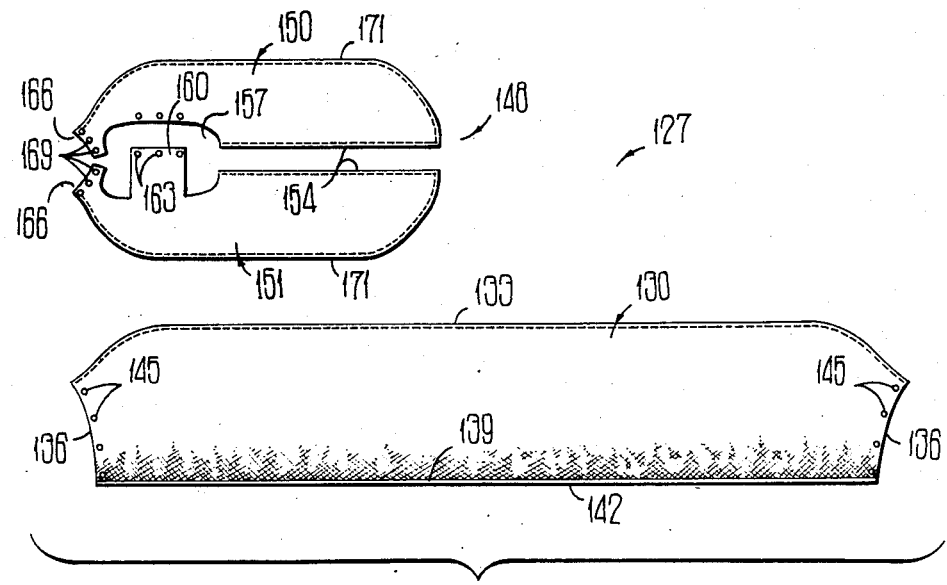

A base cover 127 is shown assembled and mounted to the robot base 109 in FIG. 4. The base cover 127 is shown in FIG. 5 generally comprising an elongated lower panel 130. The upper edge 133 of the lower base cover panel slopes downward towards each end 136 of the lower panel. An elastic band 139 runs along the length of the lower edge 142 of the lower base cover panel 130. Snaps 145 are attached along the ends 136 of the lower base cover panel 130. The base cover 127 also includes a substantially oval upper panel 148. The upper base cover panel comprises two halves 150 and 151 which are sewn together along inner edges 154. The upper base cover panel 148 also includes a substantially oval opening 157 in the forward end of the upper base cover panel. A flap 160 extends from one half 151 of the upper base cover panel 148, across the opening 157 to the other half 150, thereby separating the opening into two sections. The flap 160 attaches to the other half 150 of the upper base cover panel 148 with snaps 163. The forward ends 166 of each half 150 and 151 of the upper base cover panel 148 are connectable with snaps 169.

The upper edge 133 of the lower base cover panel 130 is sewn along the outer edge 171 of the upper base cover panel 148 to form the base cover 127. The lower base cover panel 130 fits snugly around the lower portion of the robot base 109 and the ends 136 of the lower base cover panel are removably fastened at the forward end 121 of the robot base by the snaps 145 in the ends 136. The substantially oval-shaped upper base cover panel 148 fits over the substantially oval upper portion of the robot base 109 and the forward ends 166 of the upper base cover panel are removably fastened at the forward end 121 of the robot base with the snaps 169 in the forward ends of the upper base cover panel. The flap 160 extends between the rod 118 and the lower arm 112 of the robot 100 and the rod and the lower arm extend through the two sections of the opening 157 in the upper base cover panel 148.

Figure 7:
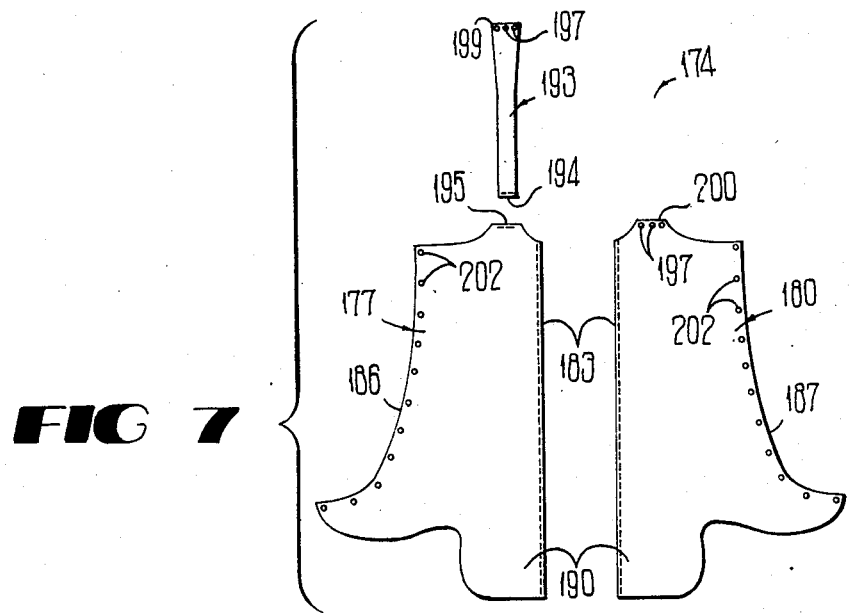

A lower arm cover 174 is shown assembled and mounted to the lower arm 112 of the robot 100 in FIG. 6. The substantially bell-shaped lower arm cover 174 is shown in FIG. 7 generally comprising two matching lower arm cover panels 177 and 180 which are sewn together along inner edges 183. The outer edges 186 and 187 flair outwardly towards the lower portion of the lower arm cover 174. The lower portion of the lower arm cover 174 extends downwardly to form a lower flap 190. A support strap 193 is sewn at one end 194 to the upper end 195 of one panel 177 of the lower arm cover 174. Snaps 197 in the other end 199 of the support strap 193 and in the upper end 200 of the other panel 180 of the lower arm cover 174 allow the support strap to be removably fastened to the other panel of the lower arm cover. Snaps 202 run along the length of each outer edge 186 and 187 of the lower arm cover 174 so that the outer edges are removably fastened to one another.

The lower arm cover 174 fits snugly around the lower arm 112 of the Graco robot 100 as shown in FIG. 6. The outer edges 186 and 187 of the lower arm cover 174 are fastened together with the snaps 202 at the rearward end of the lower arm 112. The support strap 193 extends up and over the rearward portion of the upper arm 115 of the robot 100 and is fastened to the upper end of the second lower arm cover panel with the snaps 197. The flap 190 at the lower portion of the lower arm cover 174 extends over the lower end of the rod 118 and the forward end 121 of the robot base 109.

Figure 9:
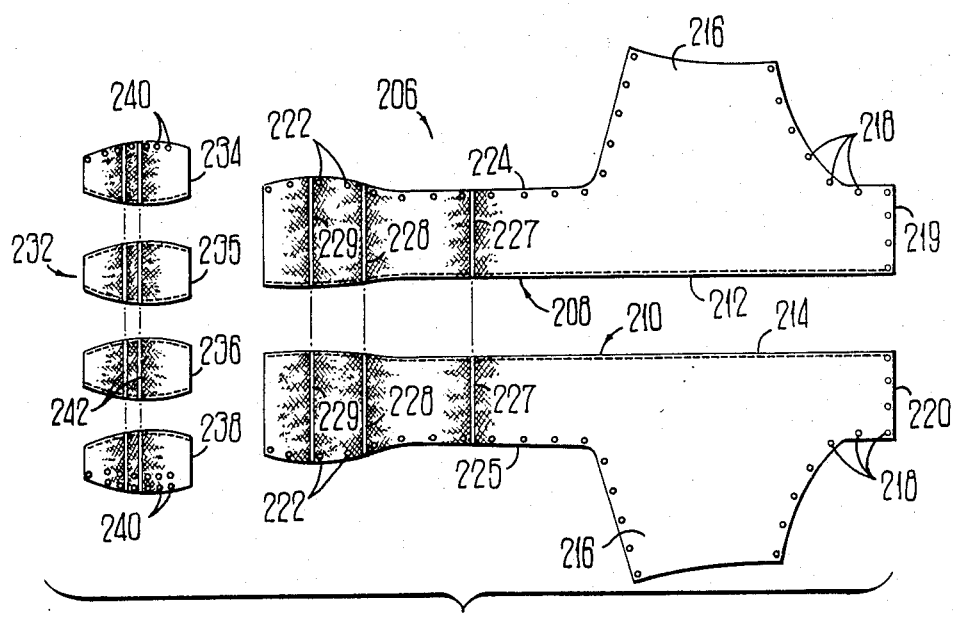

An elongated upper arm cover 206 is shown assembled and mounted to the upper arm 115 of the robot 100 in FIG. 8. The upper arm cover 206 is shown in FIG. 9 generally comprising first and second upper arm cover panels 208 and 210 which are sewn together along the inner edges 212 and 214. Flaps 216 extend outwardly from the rearward portion of both the first and second upper arm cover panels 208 and 210. Snaps 218 extend along the rearward end 219 of the first upper cover panel 208 and the rearward end 220 of the second upper cover panel 210 for removably fastening the two ends together. Snaps 222 extend along the outer edges 224 and 225 of the first and second upper arm cover panels 208 and 210 for removably fastening the forward portion of the first and second upper arm cover panels together. Elastic bands 227, 228 and 229 extend through the width of the forward portion of the upper arm cover 206.

The upper arm cover 206 also includes a tapered nozzle cover 232 extending forward from the front end of the upper arm cover. The nozzle cover 232 comprises four nozzle-cover panels 234, 235, 236 and 238 which are positioned side by side and sewn together. Snaps 240 run along the outer edges of the end nozzle cover panels 234 and 238 for removably fastening the outer end nozzle cover panels together. A pair of elastic bands 242 extends through the width of the nozzle cover 232.

As shown in FIG. 8, the upper arm cover 206 fits snugly about the upper arm 215 of the Graco robot 100. The flaps 216 extending from the rearward portion of the upper arm cover 206 fit around the upper portion of the lower arm 112 and the lower arm cover 174. The rearward ends 219 and 220 of the upper arm cover panels 208 and 210 are removably fastened together at the rearward end of the upper arm 212 with the snaps 218. The snaps 222 along the outer edges of the upper arm cover panels 208 and 210 are fastened together beneath the upper arm 115. The nozzle cover 232 fits around the spray paint nozzle 124 and the snaps 240 are fastened beneath the spray paint nozzle. The elastic bands 227, 228 and 229 in the upper arm cover 206 and the elastic bands 242 and the nozzle cover 232 assist in holding the upper arm cover and the nozzle cover snugly against the upper arm 112 and the spray paint nozzle 124.

The base cover 127, the lower arm cover 174, the upper arm cover 206, and the nozzle cover 232 each preferably comprise the SMS laminate described herein. The SMS laminate acts as a barrier to incident paint and varnish spray emitted from the spray nozzle 124. Because the base cover 127, the lower arm cover 174, the upper arm cover 206, and the nozzle cover 232 each conform to the surface of the Graco robot 100, the covers do not have loose portions which billow and rub together as the robot 100 operates. As a result, the paint or varnish which builds up on the surface of the covers is less likely to flake off and pieces of the SMS laminate are less likely to rub off. In addition, because the base cover 127, the lower arm cover 174, and the upper arm cover 206 are not physically connected to one another, each of those individual covers can be removed and replaced separately. For example, if the upper arm cover 206 becomes excessively worn or excessively caked with incident paint or varnish spray, the upper arm cover can be unsnapped and removed without removing the lower arm cover 174 or the base cover 127. A new upper arm cover can then be mounted about the upper arm 115 of the robot 100 and the older lower arm cover 174 and base cover 127 can remain on the robot until they become worn or excessively caked with incident spray.

Figure 10:
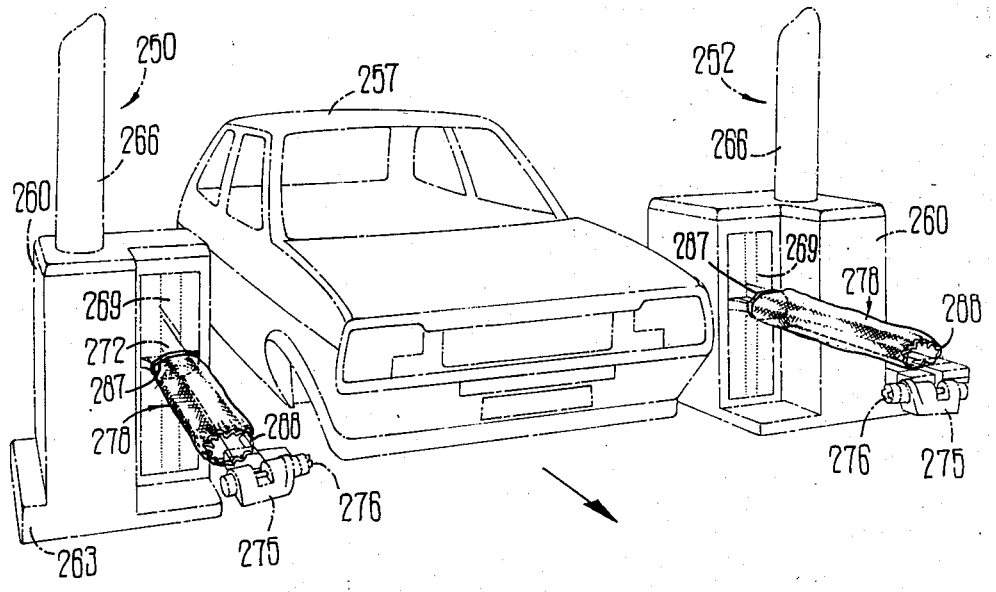
Figure 12:
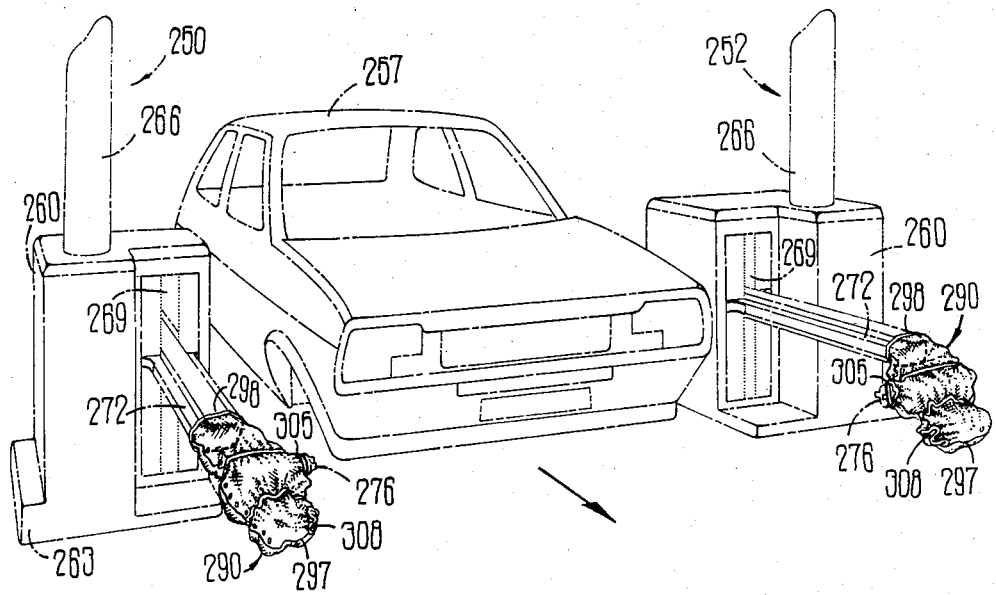
Figure 14:
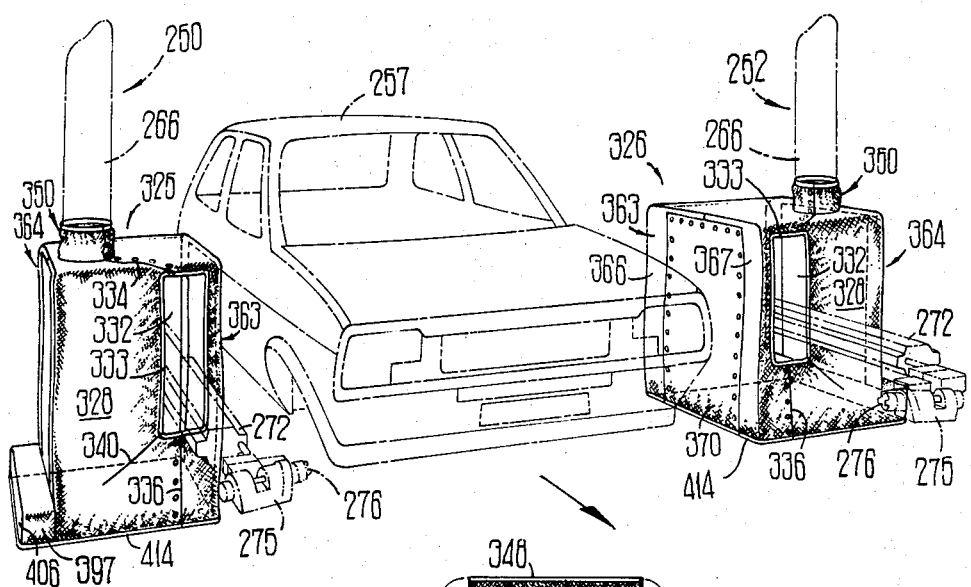

Turning to FIGS. 10, 12, and 14, left and right side reciprocators 250 and 252 of a Behr Spraymate are shown. The Behr Spraymate is manufactured by Behr Industrial Equipment, Inc. of Troy, Michigan. The left and right side reciprocators 250 and 252 are shown positioned on opposite sides of an assembly line and an automobile body 257 is shown passing between the left and right side reciprocators for illustrative purposes. Each side reciprocator 250 and 252 comprises a box-shaped base 260. A step piece 263 extends from the rearward end of the base 260. An optional cylindrical conduit 266 extends upwardly from the top of the base 260. The left and right side reciprocators 250 and 252 also include a rectangular opening 269 in the forward end of each side reciprocator and a laterally extending arm 272 extends forward from each opening substantially parallel with the assembly line. A spray nozzle 275 is pivotally mounted to the forward end of each arm 272 and comprises a spray port 276 extending toward the assembly line. It should be understood that the Behr Spraymate side reciprocators are not a part of the present invention and therefore are not discussed in further detail.

Figure 11:
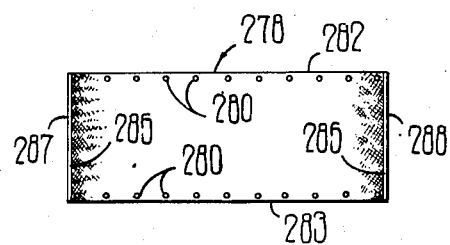

Matching arm covers 278 are shown mounted to the matching arms 272 in FIG. 10. The robot arm cover 278 is shown in FIG. 11 generally comprising a single rectangular cover panel. Snaps 280 extend along opposite edges 282 and 283 of the arm cover panel 278 for removably fastening the edges together. Elastic bands 285 extend along opposite ends 287 and 288 of the arm cover panel 278.

An arm cover 278 fits snugly about each of the arms 272. The snaps 280 along the edges 282 and 283 of the arm cover 278 are fastened together so that the edges of the arm cover are parallel to the arm. The elastic bands 285 hold the forward end 288 of the arm cover 278 about the forward end of the arm 272 and the rearward end 287 of the arm cover about the rearward end of the arm.

Figure 13:
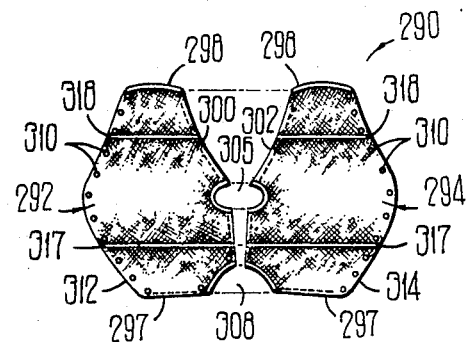

Matching nozzle covers 290 are shown assembled and mounted to each of the paint spray nozzles 275 in FIG. 12. A nozzle cover 290 is shown in FIG. 13 generally comprising two matching cover panels 292 and 294. Each of the cover panels 292 and 294 are substantially oblong in shape and taper slightly towards a substantially squared forward end 297 and taper towards a more narrow rearward end 298. The inner edges 300 and 302 of the cover panels 292 and 294 are sewn together to connect the two cover panels 292 and 294. Semicircular notches in the midsection of each edge 300 and 302 come together when the edges are sewn together to form a nozzle opening 305 in the nozzle cover 290. The forward ends 297 of the cover panels 292 and 294 are also sewn together and notches in the edges 300 and 302 at the forward ends of the cover panels come together to form an alternate nozzle opening 308. Snaps 310 extend along the outer edges 312 and 314 for removably fastening the cover panels 292 and 294 together. Elastic bands 317 extend through the width of the cover panels 292 and 294 between the nozzle opening 305 and the forward ends 297 of the cover panels. Elastic bands 318 also extend through the width of the cover panels 292 and 294 between the nozzle opening 305 and the rearward end 298 of the cover panels.

The nozzle covers 290 fit snugly about each of the paint spray nozzles 275 and conform to the shape of the paint spray nozzles. The spray port 276 of the paint spray nozzle 275 fits through the nozzle opening 305 in the nozzle cover 290. The outer edges 312 and 314 are fastened together with the snaps 310 along the side of the paint spray nozzle 275 opposite the spray port 276. The forward end 297 of the nozzle cover 290 fits over the forward end of the paint spray nozzle 275 and the rearward end 298 of the nozzle cover panel fits tightly around the forward end of the robot arm 272 and the forward end of the arm cover 278 with the aid of the elastic bands 319. The elastic bands 317 and 318 hold the nozzle cover 290 tightly about the paint spray nozzle 275 on each side of the paint spray port 276.

Figure 15:
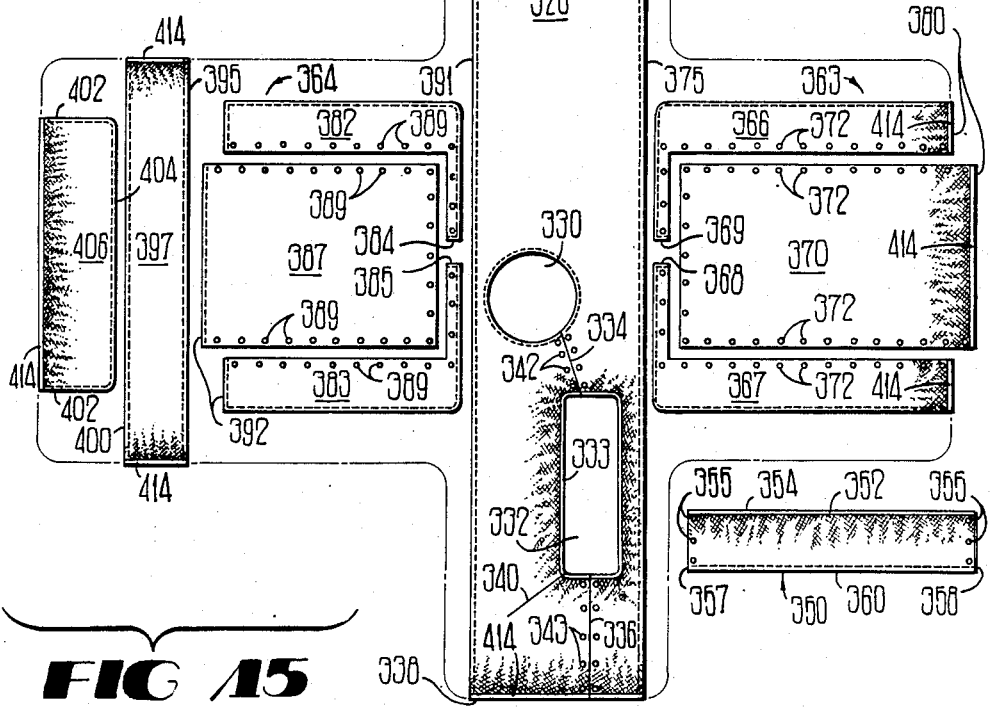

Base covers 325 and 326 are shown assembled and mounted to the base 260 of each side reciprocator 250 and 252 respectively in FIG. 14. The left reciprocator base cover 325 is shown in FIG. 15. The right reciprocator base cover 326 is a mirror image of the left reciprocator base cover 325 and like numerals are used to identify corresponding parts of each base cover in FIG. 14. The left reciprocator base cover 325 includes a rectangular central panel 328. The central panel 328 includes a cylindrical opening 330 for receiving the conduit 266 of a side reciprocator 252 positioned near the midsection of the central panel offset from the longitudinal axis of the central panel. The central panel 328 also includes a rectangular opening 332 positioned below the conduit opening 330 so that the rectangular opening 269 in the side reciprocator base 260 is not covered when the base cover 325 is placed about the base. Elastic bands 333 run along the perimeter of the rectangular opening 332 separated by the slits 334 and 336 in the central panel 328. A diagonal slit 334 runs from the conduit opening 330 to the upper end of the rectangular opening 332, a second slit 336 runs from the bottom of the rectangular opening 332 to the bottom end 338 of the central panel 328, and a third slit 340 runs from the lower end of the rectangular opening diagonally towards the outer edge of the central panel away from the second slit. Snaps 342 run along the first slit 334 and snaps 343 run along the second slit 336 for removably fastening the central panel 328 along the first and second slits.

The base cover 325 also includes a narrow rectangular conduit cover 350. The conduit cover 350 includes an elastic band 352 which runs along the top edge 354 of the conduit cover. Snaps 355 extend along each end 357 and 358 for removably fastening the ends of the conduit cover together. The lower edge 360 of the conduit cover 350 is sewn to the central cover panel 328 about the conduit opening 330 so that the conduit cover extends upwardly from the central panel and the snaps 355 in the conduit cover are aligned with the snaps 342 in the first slit 334 of the central panel.

The base cover 325 also includes side panels 363 and 364. The side cover panel 363 which covers the side of the base 260 facing the assembly line includes two inverted L-shaped panels 366 and 367. The ends 368 and 369 of the upper legs of the panels 366 and 367 are sewn together to form a rectangular-shaped side panel 363 with a rectangular opening. A rectangular access flap 370 fits over the rectangular opening and is removably fastenable about the rectangular opening with snaps 372 which extend along the outer edges of the access flap and the inner edges of the L-shaped panels 366 and 367 to complete the side panel 363. The forward edge 375 of the central panel is sewn along the side and top edges of the side panel 363 so that the ends 338 and 348 of the central panel are substantially perpendicular to the bottom edge 380 of the side panel. An elastic band 381 runs along the bottom edge 380 of the access flap 370.

The other side panel 364 also includes two inverted L-shaped panels 382 and 383 with the ends 384 and 385 of the upper legs sewn together. An access flap 387 covers the rectangular opening in the side panel 364 and is removably fastenable about the rectangular opening with snaps 389 which run along the outer edge of the access flap and the inner edges of the inverted L-shaped panels 382 and 383. The other edge 391 of the central panel 328 is sewn to the side and top edges of the side panel 364 so that the ends 338 and 348 of the central panel are substantially perpendicular to the lower edge 393 of the side panel 364. The lower edge 392 of the side panel 364 is sewn to the upper edge 395 of a narrow rectangular panel 397. Each end of the upper edge 395 of the rectangular panel 397 is sewn to the ends of the edge 391 of the central panel 328 extending below the side panel 364. The bottom edge 400 of the rectangular panel 397 is sewn to the sides 402 and top 404 of another shorter rectangular panel 406 to form a cover for the step piece 263 of the base 260.

A single elastic band 414 runs along the bottom edge of the L-shaped panel 367 and the bottom end 338 of the central panel 328 to the slit 336 in the central panel. Another elastic band 414 runs from the slit 336 in the central panel 328 along the bottom end 338 of the central panel, along one end of the rectangular panel 397, along the bottom of the shorter rectangular panel 406, along the opposite end of the rectangular panel 397, along the other end 348 of the central panel, along the bottom edge 380 of the side panel 370 and along the bottom end of the central panel to the slit.

The base cover 325 fits snugly about the side reciprocator 252 and conforms to the shape of the side reciprocator as shown in FIG. 14. The central panel 328 of the base cover 325 fits over the top of the base 260 so that the conduit cover 360 fits around the conduit 266 and the rectangular opening 332 fits around the rectangular opening 269 in the base. When the base cover 325 is mounted about the base, the snaps 355, 342 and 343 in the central panel are unfastened so that the base cover can be mounted without the conduit 266 or the robot arm 272 interfering. When the base cover 325 is in position, the snaps 355, 342 and 343 are fastened. The side panel 363 of the base cover 325 covers the side of the base 260 facing the assembly line and the side cover 264 covers the side of the base facing away from the assembly line. The rectangular panels 397 and 406 cover the step piece 263 of the base 260. The elastic band 414 holds the base cover firmly about the bottom of the base 260.

The access flaps 370 and 387 can be removed by unfastening the snaps 372 and 389. This allows quick and easy access to the base 260 for any necessary maintenance without removing the entire base cover 325. As with the Graco robot cover described previously, the base cover 325, the arm cover 278, and the nozzle cover 290 are each individually replaceable so that each cover can be replaced separately when they become worn or caked with incident spray. Also, because these covers conform to the respective pieces of the side reciprocators, the covers do not billow as the side reciprocators operate and the likelihood of pieces of the incident paint spray caked on the outer surface of the covers and portions of the covers themselves detaching form the covers is substantially reduced.

The base cover 325, the arm cover 278, and the nozzle cover 290 each preferably comprise the SMS laminate described herein.

Figure 16:
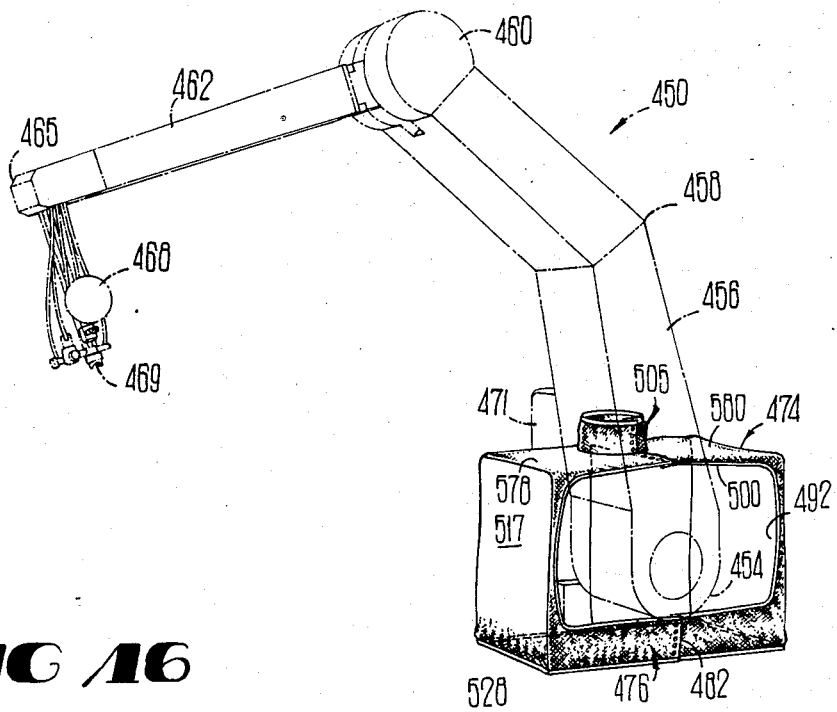

Turning to FIGS. 16, 18, 20, 22, 24, and 26, an overhead reciprocator 450 of a Behr Spraymate is shown. The Behr overhead reciprocator is also manufactured by Behr Industrial Equipment, Inc. of Troy, Michigan. The overhead reciprocator 450 comprises a box-shaped base 452. The lower end 454 of a lower arm 456 is pivotally mounted to one side of the base 452. The arm 456 extends upwardly from the base 452 and bends slightly forward at 458 towards a rounded upper end 460. An upper arm 462 is pivotally mounted to the rounded forward end 460 of the lower arm 456 and extends forward from the rounded end of the lower arm to a forward end 465. A paint spray nozzle assembly 468 is mounted to the forward end 465 of the upper arm 462 and extends below the forward end. The paint spray nozzle assembly includes a pair of spray ports 469. A conduit (not shown) extends vertically and upwardly from the top of the base 452. A box-shaped color cabinet 471 is positioned behind the base 452 as shown in FIG. 16. It should be understood that the Behr Spraymate overhead reciprocator is not a part of the present invention and is not discussed in further detail.

Figure 17:
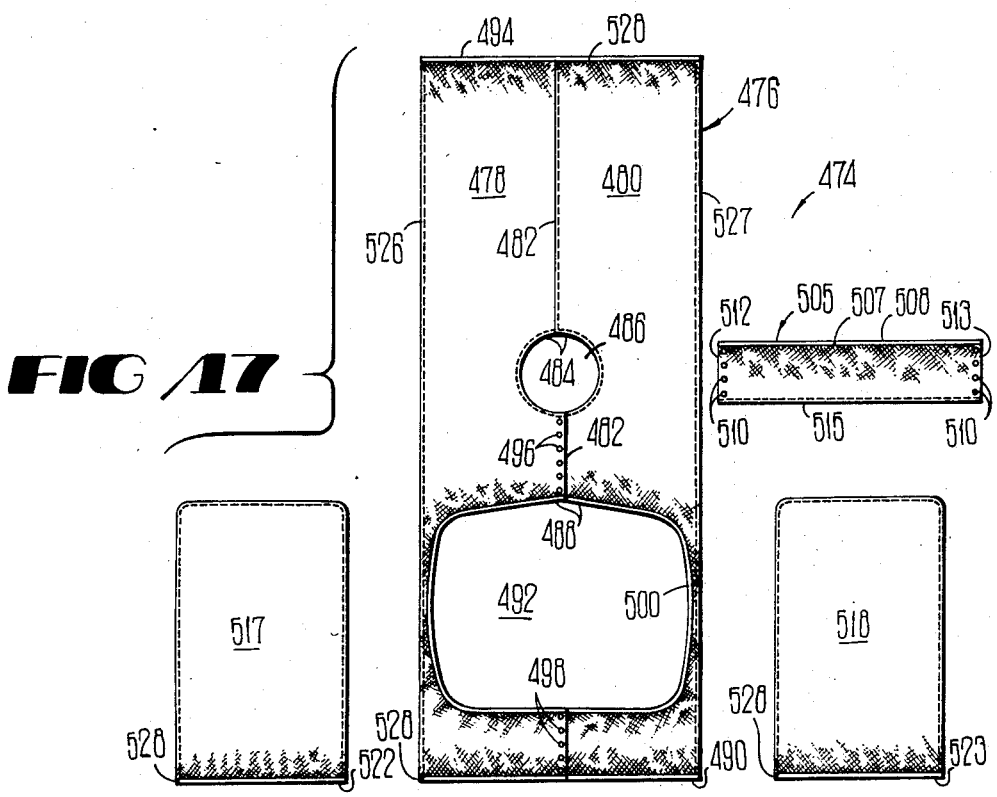

A base cover 474 is shown mounted to the base 452 in FIG. 16. The base cover 474 is shown in FIG. 17 generally comprising an elongated rectangular central panel 476. The central panel 476 includes two halves 478 and 480 connected along inner edges 482. Semicircular notches 484 in the inner edges 482 of the panels 478 and 480 form a circular opening 486 in substantially the center of the central panel 476. Substantially rectangular notches 488 in the inner edges 482 of the panels 478 and 480 between the circular opening 486 and the lower end 490 of the central panel 476 form a substantially rectangular opening 492 in the central panel. The panels 478 and 480 are sewn together along the inner edges 482 from the upper edge 494 of the central panel 474 to the circular opening 486. Snaps 496 fasten the edges 482 together between the circular opening 486 and the substantially rectangular opening 492. Snaps 498 fasten the edges 482 together from the substantially rectangular opening 492 to the bottom edge 490 of the central panel 476. Elastic bands 500 run along the inner edges of the substantially rectangular notches 488.

The base cover 474 also includes a narrow rectangular conduit cover 505. The conduit cover 505 includes an elastic band 507 which runs along the top edge 508 of the conduit cover. Snaps 510 extend along each end 512 and 513 for removably fastening the ends of the conduit cover 505 together. The lower edge 515 of the conduit cover 505 is sewn to the central panel 476 about the circular opening 486 so that the conduit cover extends upwardly from the central panel and the snaps 510 in the conduit cover are aligned with the snaps 496 in the central panel.

The base cover 474 also comprises matching side panels 517 and 518 each having lower edges 522 and 523 respectively. The top and side edges of the first side panel are sewn to a side edge 526 of the central panel 476 so that the upper edge 494 of the central panel meets one end of the lower edge 522 of the first side panel and the lower edge 490 of the central panel meets the opposite end of the lower edge of the first side panel. The second side panel 518 is likewise sewn to the opposite side edge 527 of the central panel 476 so that the lower edges 522 and 523 connect the ends of the lower and upper edges 490 and 494 of the central panel. An elastic band 528 runs along the lower edge 490 of the central panel 476, along the lower edge 522 of the side panel 547 along the upper edge 494 of the central panel, and along the lower edge 523 of the other side panel 518.

The base cover 474 fits snugly about the base 452 of the overhead reciprocator 450 as shown in FIG. 16. To mount the base cover 474 about the base 452 snaps 510, 496, and 498 are unfastened and the base cover is placed around the base so that the lower arm 456 extends through the substantially rectangular opening 492 and the conduit extending from the top of the base fits through the circular opening 486. The snaps 496 and 510 between the conduit and the lower arm 456 are then fastened, and the snaps 498 below the lower end 454 of the lower arm are fastened. The elastic band 508 in the top edge 507 of the conduit cover 505 holds the conduit cover tightly against the conduit. The elastic band 528 holds the lower edges 522, 523, 490, and 494 of the base cover 474 tightly about the lower edge of the base 452.

Figure 18:
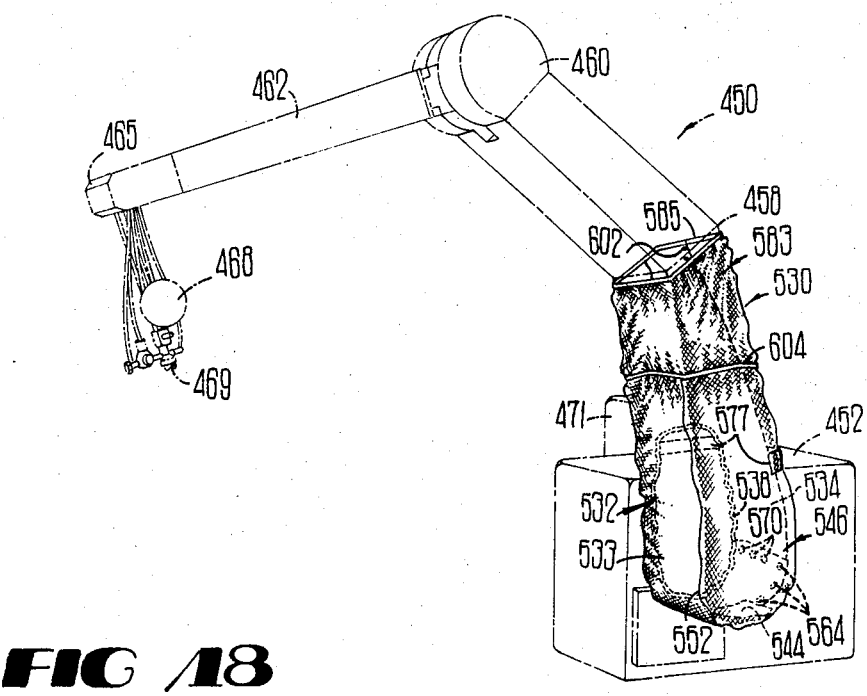
Figure 19:
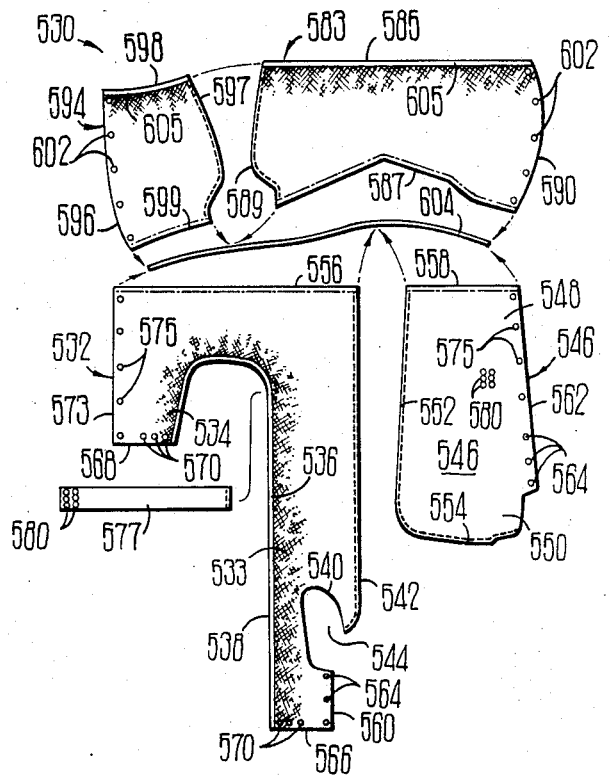

A lower arm cover 530 is shown assembled and mounted to the lower arm 456 in FIG. 18. The lower arm cover 530 is shown in FIG. 19 comprising a hook-shaped first lower panel 532 having an elongated leg 533 extending downwardly opposite a shorter leg 534 also extending downwardly. An elastic band 536 runs along the inner edge 538 of the elongated leg 533 and the shorter leg 534 of the first lower panel 532. A notch 540 in the outer edge 542 of the elongated leg 533 forms a conduit opening 544 proximate the lower end of the elongated leg. The lower arm cover 530 also comprises a second lower panel 546 having a squared upper end 548 and a roughly rounded lower portion 550. The inner edge 552 and the lower edge 554 of the second lower panel 546 is sewn to the outer edge 542 of the elongated leg 533 so that the upper edge 556 of the first lower panel 532 meets the upper edge 558 of the second lower panel. The outer edge 560 of the lower portion of the elongated leg 533 is removably fastened to the lower portion of the outer edge 562 of the second lower panel 546 with snaps 564. The bottom edge 566 of the elongated leg 533 is removably fastened to the bottom edge 568 of the shorter leg 534 with snaps 70. The outer edge 573 of the shorter leg 534 is removably fastened to the outer edge 562 of the second lower panel 546 with snaps 575. An elongated rectangular strap 577 is sewn at one end to the upper portion of the elongated leg 533 adjacent the inner edge 538. The other end of the rectangular strap 577 is removably fastened to the second lower panel 546 with snaps 580.

The lower arm cover 530 also comprises a first elongated upper panel 583 having a straight upper edge 585 and a contoured lower edge 587 which extends inwardly from rounded side edges 589 and 590 towards the center of the first upper panel. The lower arm cover 530 also comprises a second oblong upper panel 594 having substantially rounded side edges 596 and 597 and substantially straight upper and lower edges 598 and 599. The inner edge 597 of the second upper panel 594 and the inner edge 589 of the first upper panel 583 are sewn together. The lower edge 599 of the second upper panel is sewn to the upper edge 556 of the first lower panel so that the outer edge 596 of the second upper panel meets the outer edge 573 of the first lower panel. The lower edge 587 of the first upper panel 583 is sewn to the upper edge 556 of the first lower panel 532 and the upper edge 558 of the second lower panel 546 so that the outer edge 590 of the first upper panel meets the outer edge 562 of the second lower panel. The outer edge 596 of the second upper panel 594 is removably fastened to the outer edge 590 of the first upper panel 583 with snaps 602. An elastic band 604 extends between the lower panels, 532 and 546, and the upper panels, 583 and 594. Another elastic band 605 runs along the upper edges 598 and 585 of the second upper panel 594 and the first upper panel 583 respectively.

The lower arm cover 530 fits snugly around the lower portion of the lower arm 456 from the lower end 454 to the point 458 at which the lower arm bends as shown in FIG. 18. To place the lower arm cover 530 about the lower arm 456, the snaps 564, 570, 575, 580, and 602 are all unfastened. The lower arm cover 530 is then placed around the lower arm 456 so that the upper edges 585 and 598 fit about the lower arm at the point 458 where the lower arm bends. Snaps 602 are then fastened along the rearward side of the lower arm as partially shown in FIG. 18. The elastic bands 605 and 604 hold the upper portion of the lower arm cover 530 firmly about the lower arm 456. The second lower panel 546 and the elongated leg 533 of the first lower panel 532 cover the forward-facing sides of the lower arm as shown in FIG. 18. The outer edge 573 of the first lower panel 532 is fastened to the outer edge 562 of the second lower panel with the snaps 575. The lower portion of the elongated leg 533 fits under the lower end 454 of the lower arm 456 and the outer edge 560 of the lower portion of the elongated leg is fastened to the lower portion of the outer edge 562 of the second lower panel 546 with snaps 564. The bottom edge 566 of the elongated leg 533 is fastened to the bottom edge of the shorter leg 534 with snaps 570. Lastly, the strap 577 wraps around the rearward facing sides of the lower arm 456 and is fastened to the second lower panel 546 with snaps 580. The elastic band 536 in the first lower panel holds the lower arm cover 530 firmly about the lower arm 456.

Figure 20:
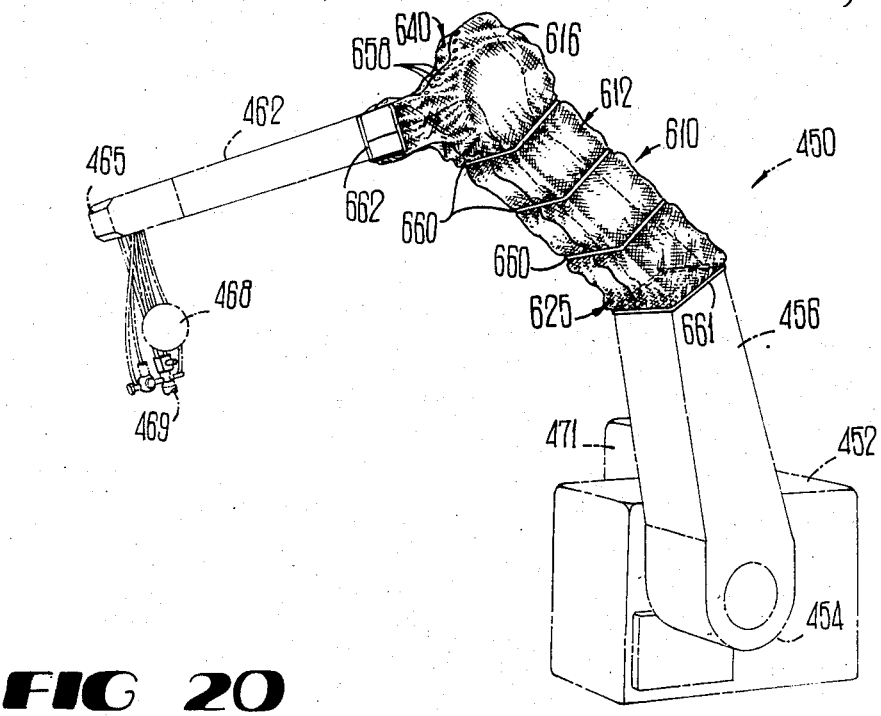
Figure 21:
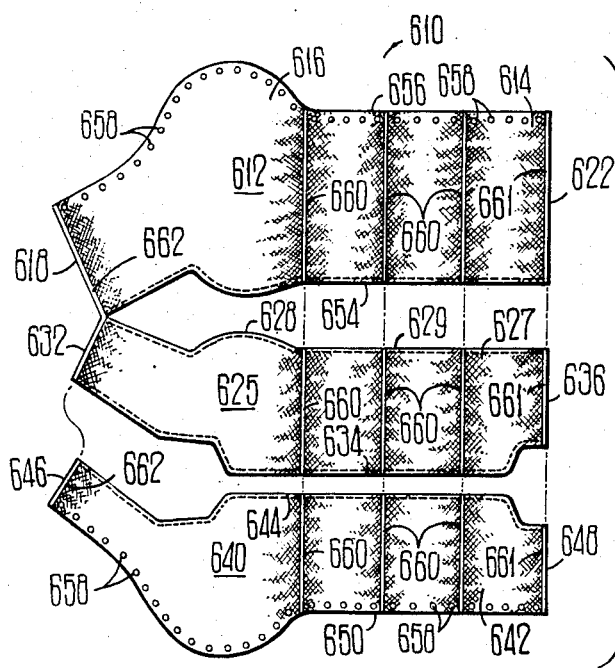

Turning to FIG. 20, a knob cover 610 is shown assembled and mounted to the upper end 460 of the lower arm 456. The knob cover 610 is shown in FIG. 21 comprising a first panel 612. The first panel 612 has a rectangular portion 614 having a squared end 615 and an oblong portion 616 which extends forward and outwardly from the rectangular portion and then tapers inwardly toward an opposite end 618. The knob cover 610 also includes a second panel 625 having a substantially rectangular portion 627. The upper edge 629 of the second panel extends outwardly and inwardly from the rectangular portion 627 to form a rounded portion 628 and then extends outwardly to a squared end 632. The lower edge 634 follows a contoured path inwardly and forwardly from the rectangular portion 627 to the squared end 632. The lower edge 634 is notched at the opposite end 636 of the second panel. The knob cover 610 also comprises a third panel 640 which also has a substantially rectangular portion 642. The upper edge 644 of the third panel 640 extends inwardly then outwardly from the rectangular portion 642 to a squared end 646. The upper edge 644 has a notch 647 at the opposite end 648 of the third panel. The lower edge 650 extends outwardly and then inwardly from the rectangular portion 642 towards the squared end 646.

The lower edge 654 of the first panel 612 is sewn to the upper edge 629 of the second panel 625 so that the squared end 618 of the first panel meets the squared end 632 of the second panel, and the opposite end 621 of the first panel meets the opposite end 638 of the second panel. The lower edge 634 of the second panel is sewn to the upper edge 644 of the third panel so that the squared end 646 of the third panel meets the squared end 632 of the second panel, and the opposite end 653 of the third panel meets the opposite end 638 of the second panel. The lower edge 650 of the third panel is removably fastened to the upper edge 656 of the first panel 45 with snaps 658.

Three elastic bands 660 extend parallel to and spaced from one another from the upper edge 656 of the first panel 612, across the first panel, the second panel 625, and the third panel 640 to the lower edge 650 of the third panel. A single elastic band 661 runs along the ends 615, 636, and 648 of the first, second and third panels 612, 625 and 640. Another single elastic band 662 runs along the opposite ends 618, 632, and 646 of the first, second and third panels 612, 625, and 640.

The snaps 658 are unfastened to mount the knob cover 610 about the upper portion 460 of the lower arm 456. The knob cover 610 is then placed about the lower arm 456 so that the squared ends 618, 632, and 646 fit around the rearward end of the upper arm 462 and the opposite ends 622, 636, and 648 fit about the lower arm at the point 458 where the lower arm bends. The snaps 658 are then fastened along the upper side of the lower arm 456. The elastic band 662 holds the knob cover 610 tightly about the rearward end of the upper arm 462. The elastic band 661 holds the knob cover 610 tightly about the point 458 where the lower arm 456 bends and the upper portion of the lower arm cover 530. The three elastic bands 660 hold the knob cover 610 firmly about the lower arm 456 between the rounded upper end 460 and the upper portion of the lower arm cover 530.

Figure 22:
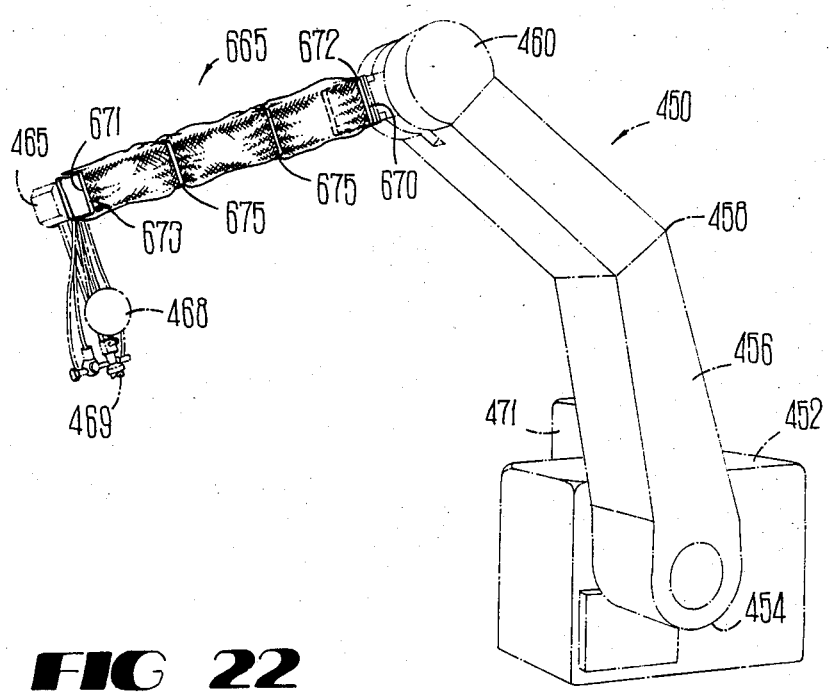
Figure 23:
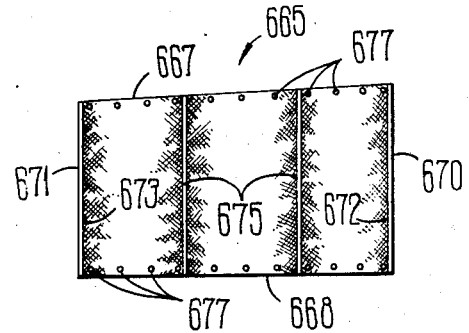

Turning to FIG. 22, an upper arm cover 665 is shown assembled and mounted to the upper arm 462 of the overhead reciprocator 450. The upper arm cover 665 is shown in FIG. 23 having a trapezoidal shape with upper and lower edges 667 and 668 sloping slightly inwardly from the large end 670 towards the smaller end 671. Elastic bands 672 and 673 run along the ends 670 and 671 respectively. Two parallel spaced elastic bands 675 extend through the midsection of the upper arm cover 665 from the upper edge 667 to the lower edge 668. The upper edge 667 is removably fastened to the lower edge 668 with snaps 667 running along both edges.

The upper arm cover 665 fits snugly about the upper arm 462 as shown in FIG. 22. The smaller end 671 of the upper arm cover 665 is placed about the forward end 465 of the upper arm 462 and the larger end 670 is place about the opposite end of the upper arm. The upper and lower edges 667 and 668 are fastened together with the snaps 677. The elastic band 673 in the smaller end 671 holds the smaller end firmly about the forward end 465 of the upper arm 462 and the elastic band 672 in the larger end 670 holds the larger end firmly about the opposite end of the upper arm and the upper portion of the knob cover 610. The elastic band 675 holds the midsection of the upper arm cover 665 firmly about the upper arm 462.

Figure 24:
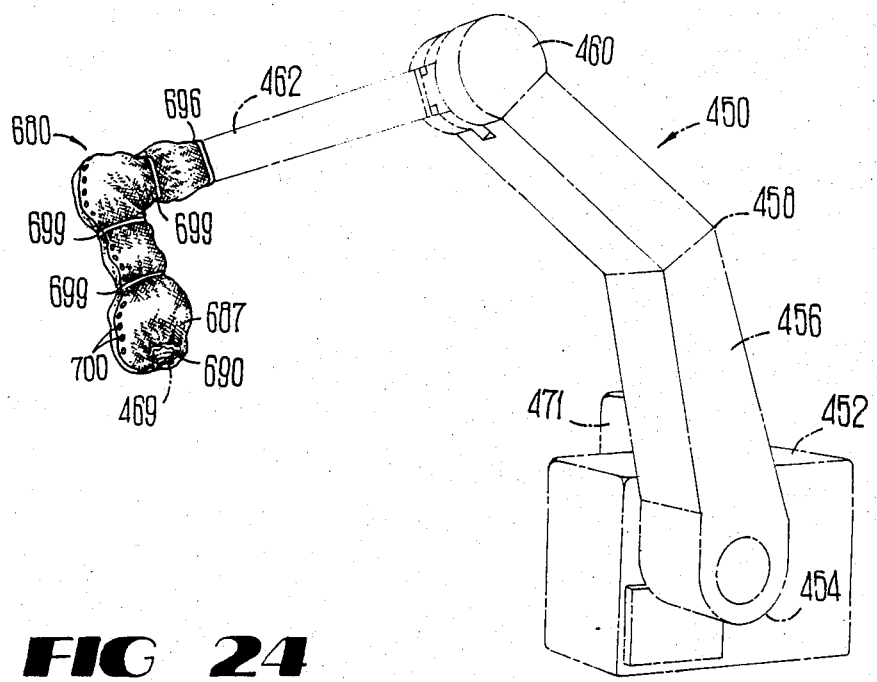
Figure 25:
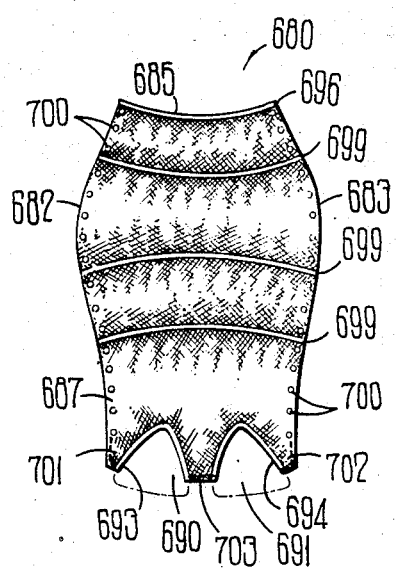

Turning to FIG. 24, a nozzle cover 680 is shown assembled and mounted to the nozzle 465 of the overhead reciprocator. The nozzle cover 680 is shown in FIG. 25 as oblong in shape with outer edges 682 and 683 which taper inwardly and upwardly towards an arcuate upper end 685. The edges 682 and 683 also taper inwardly and downwardly towards a lower end 687. A pair of notches 690 and 691 extend inwardly from the lower end 687 of the nozzle cover 680. Elastic bands 693 and 694 run along the edge of each of the notches 690 and 691. Another elastic band 696 runs along the arcuate end 685. Three parallel spaced elastic bands 699 extend through the midsection of the nozzle cover 680 between the edges 682 and 683. The edges 682 and 683 are removably fastened together with snaps 700 which run along each of the edges. The lower portion 701 of one edge 682 of the nozzle cover 680 is sewn to the lower portion 702 of the opposite edge 683 of the nozzle cover and the bottom edge 703 of the nozzle cover between the two notches 690 and 691 is sewn to the bottom edge of the nozzle cover adjacent the lower portions 701 and 702 so that the notches 690 and 691 form a pair of spray port openings.

The nozzle cover 680 fits snugly around the paint spray nozzle 468 as shown in FIG. 24. The arcuate end 685 of the nozzle cover fits around the forward end 465 of the upper arm 462. The snaps 700 fasten the edges 682 and 683 of the nozzle cover 680 together. The nozzle spray ports 469 extend through the openings created by the notches 690 and 691 in the lower end of the nozzle cover 680.

Figure 26:
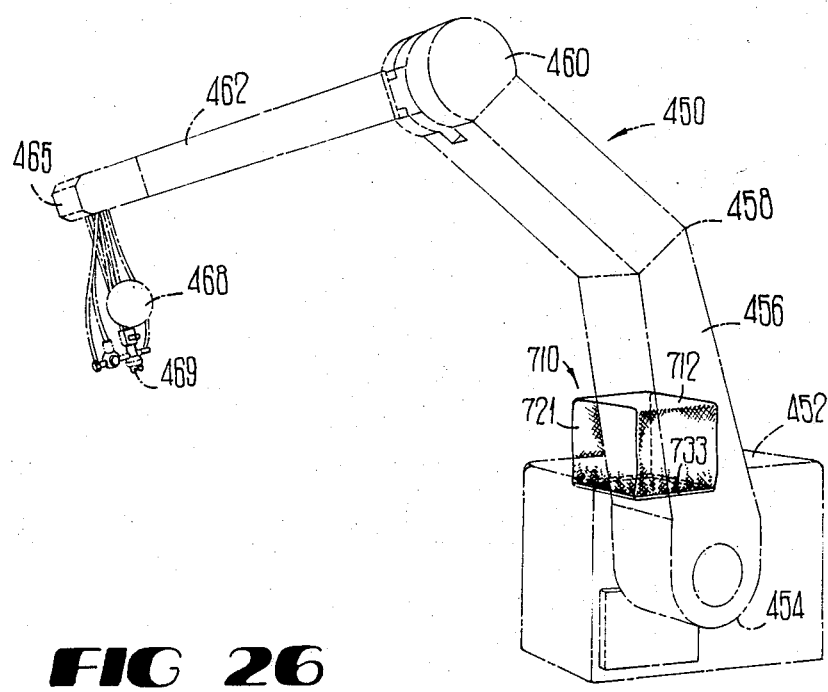
Figure 27:
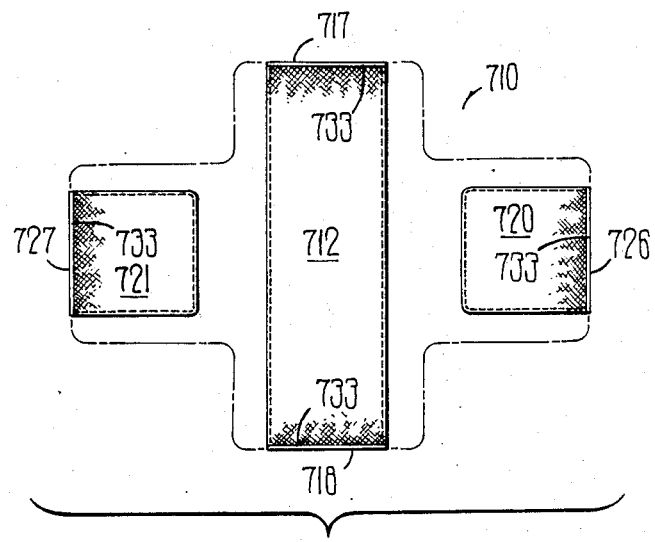

Turning to FIG. 26, a color changer cabinet cover 710 is shown assembled and mounted to the color changer cabinet. The overhead reciprocator is shown in broken lines in front of the color changer cabinet in FIG. 26. The color changer cabinet cover 710 is shown in FIG. 27 generally comprising a central elongated rectangular panel 712 having upper and lower ends 717 and 718. The color changer cabinet cover 710 also includes a pair of matching side panels 720 and 721 having lower edges 726 and 727. The top and side edges of the first side panel 720 are sewn to a side edge 730 of the central panel 712 so that the upper edge 717 of the central panel meets one end of the lower edge 726 of the first side panel and the lower edge 718 of the central panel meets the opposite end of the lower edge of the first side panel. The second side panel 721 is likewise sewn to the opposite side edge 732 of the central panel 712. A single elastic band 733 runs along the lower end 718 of the central panel 712, along the lower edge 727 of the side panel 721, along the upper end 717 of the central panel, and along the lower edge 726 of the other side panel 720.

The color changer cabinet cover 710 fits snugly about the color changer cabinet 471 as shown in FIG. 26. The color changer cabinet cover 710 slips over the top of the color changer cabinet 471 and the elastic band 733 holds the color changer cabinet cover tightly about the lower edges of the color changer cabinet.

The base cover 474, the lower arm cover 530, the knob cover 610, the upper arm cover 665, the nozzle cover 680, and the color changer cabinet cover 710 for the Behr overhead reciprocator each preferably comprise the SMS laminate described herein. Again, as with the Graco robot cover described previously, the base cover 474, the lower arm cover 530, the knob cover 610, the upper arm 665, the nozzle cover 680, and the color changer cabinet cover 710 are each individually replaceable so that each cover can be replaced separately when they become worn or caked with incident spray. Also because these covers conform to the respective pieces of the overhead reciprocator, the covers do not billow as the overhead reciprocator operates, and the likelihood of pieces of the incident spray caked on the outer surface of the covers and portions of the covers themselves detaching from the covers is substantially reduced.

Figure 28:
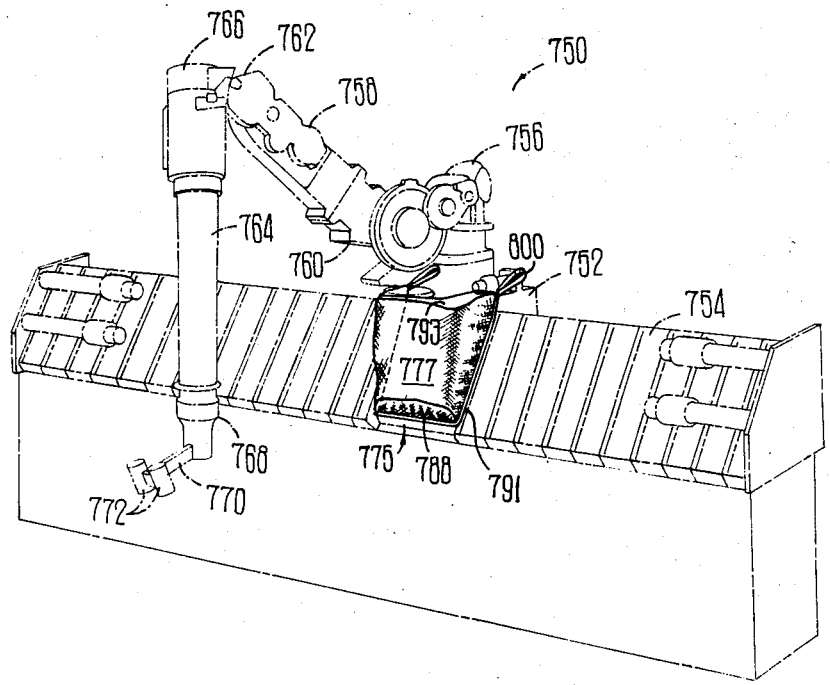

Turning to FIGS. 28, 30, 32, 34, 36, 38, and 40, a GMF N/C painter robot 750 is shown. The GMF robot 750 is manufactured by GMF Robotics Corporation of Auburn Hills, Michigan. The GMF robot 750 comprises a box-shaped base 752 which is shown in FIG. 28 mounted to a track 754 along which the GMF robot moves horizontally. A shoulder 756 is pivotally mounted to the top of the base 752 and extends upwardly from the base. A lower arm 758 is pivotally mounted at a lower end 760 to the shoulder 754 and extends forward and upwardly to a forward end 762. An upper arm 764 is pivotally mounted at a rearward end 766 to the forward end 762 of the lower arm 758. The upper arm 764 extends forward to a wrist 768. A paint spray nozzle 770 is pivotally mounted to the wrist 768 and extends forward from the wrist. The paint spray nozzle 770 includes a pair of spray ports 772. It should be understood that the GMF robot is not a part of the present invention and is not discussed in further detail.

Figure 29:
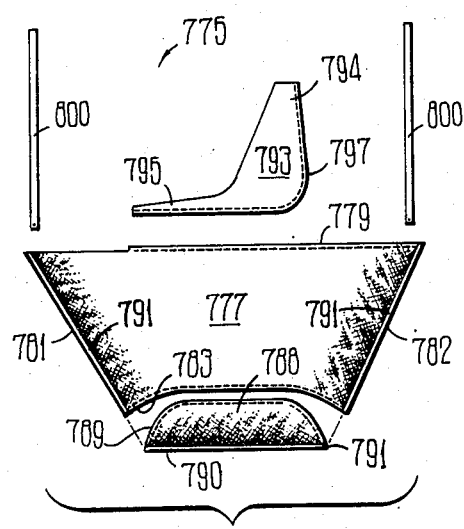

Turning to FIG. 28, a base cover 775 is shown assembled and mounted to the base 752. The base cover 775 is shown in FIG. 29 comprising a central panel 777 having a straight upper edge 779 and two side edges 781 and 782 which slope inwardly to a contoured lower edge 783. The lower edge 783 extends slightly inwardly towards the center of the central panel 777. The base cover 775 also includes a narrow lower panel 788 having an upper edge 789 which slopes downwardly at each end towards a straight lower edge 790. The upper edge 789 of the lower panel 788 is sewn to the lower edge 783 of the central panel 777 so that one end of the lower edge 790 of the lower panel meets a side edge 781 of the central panel 777 and the opposite end of the lower edge of the lower panel meets the opposite side edge 782 of the central panel. An elastic band 791 runs along the side edge 781, along the lower edge 790, and along the other side edge 782. The base cover 775 also includes a roughly L-shaped collar piece 793 having an upper leg 794 and a lower leg 795. The forward edge 797 of the collar piece 793 is sewn to the upper edge 779 of the central panel 777 so that the top end of the upper leg 794 meets the side edge 782 of the central panel. Elastic bands 800 are attached at each end to opposite ends of the upper edge 779 of the central panel 777 forming elastic loops.

The base cover 775 is shown mounted snugly about the forward portion of the base 752 in FIG. 28. The elastic bands 800 are hooked to the top of the base 752 on each side of the shoulder 754. The collar 793 fits over the forward portion of the base 752 in front of the shoulder 754. The central panel 777 covers the forward portion of the base 752 and the elastic band 791 holds the base cover 775 firmly about the forward portion of the base.

Figure 30:
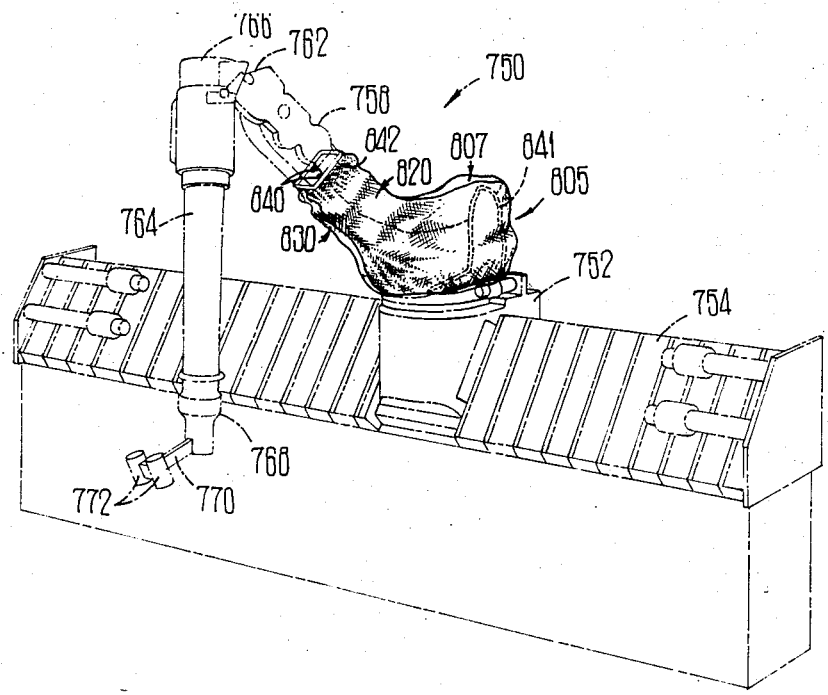
Figure 31:
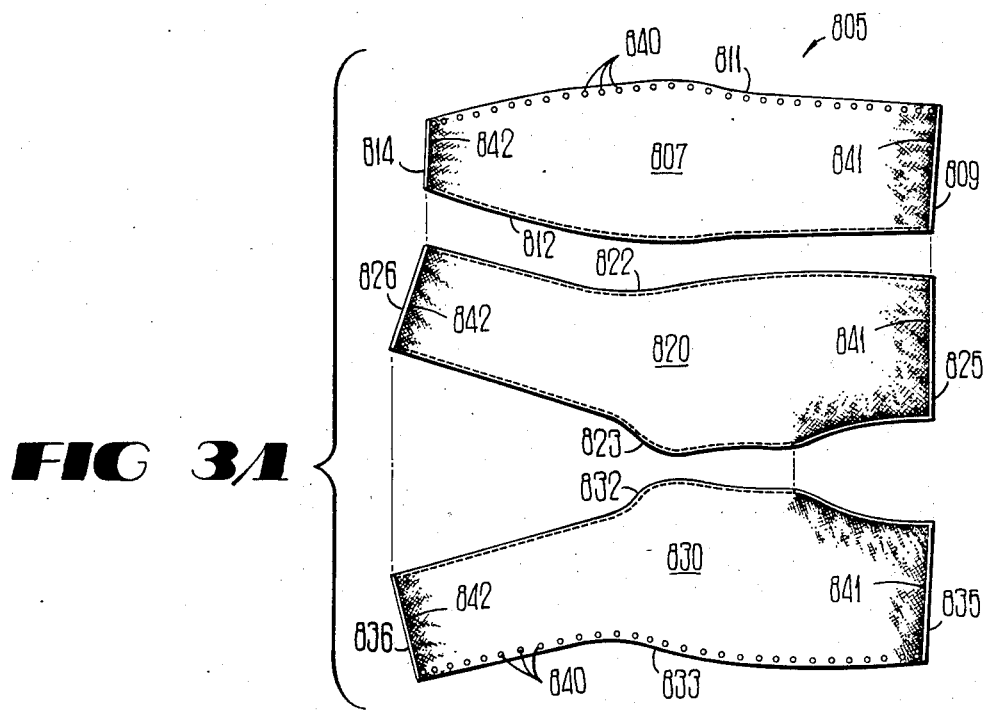

A shoulder cover 805 is shown assembled and mounted to the shoulder 754 and the lower portion of the lower arm 762 in FIG. 30. The shoulder cover 805 is shown in FIG. 30 comprising a first elongated panel 807. The first panel 807 has a squared end 809 and upper and lower edges 811 and 812 which extend slightly outwardly towards the center of the first panel and then taper inwardly towards a more narrow end 814. The shoulder cover 805 also comprises a second elongated panel 820 having upper and lower edges 822 and 823 which extend from an end 825 slightly outwardly towards the center of the second panel 820 and then taper inwardly towards another end 826. The shoulder cover 805 also comprises a third panel 830 which has upper and lower edges 832 and 833 which extend slightly outwardly from an end 835 towards the center of the third panel and then taper inwardly towards a substantially square end 836. The lower edge 812 of the first panel 807 is sewn to the upper edge 822 of the second panel 820 so that the ends 809 and 814 of the first panel meet the ends 825 and 826 of the second panel respectively. The lower edge 823 of the second panel 820 is sewn to the upper edge 832 of the third panel 830 so that one end 826 of the second panel meets one end 835 of the third panel and the portions of the second and third panels proximate the opposite ends 825 and 835 remain unattached. The upper edge 811 of the first panel 807 and the lower edge 833 of the third panel 830 are removably fastened together with snaps 840 which run along the edges. A single elastic band 841 runs along the ends 809, 825 and 835 of the first, second and third panels 807, 820, and 830 and the same elastic band runs along the unattached portions of the edges 823 and 832. Another single elastic band 842 runs along the opposite ends 814, 826, and 836 of the first, second, and third panels 807, 820, and 830.

The shoulder cover 805 fits snugly around the shoulder 754 and the lower portion of the lower arm 758 so that the edges 811 and 833 are fastened with the snaps 840 along the back side of the lower arm and shoulder as viewed in FIG. 30. The elastic band 842 holds the shoulder cover 805 tightly around the midsection of the lower arm 758 and the elastic band 841 holds the opposite end of the shoulder cover firmly about the lower end of the shoulder 754 adjacent the base 752 and form an opening 843 at the rearward end of the shoulder 754.

Figures 32, 33:
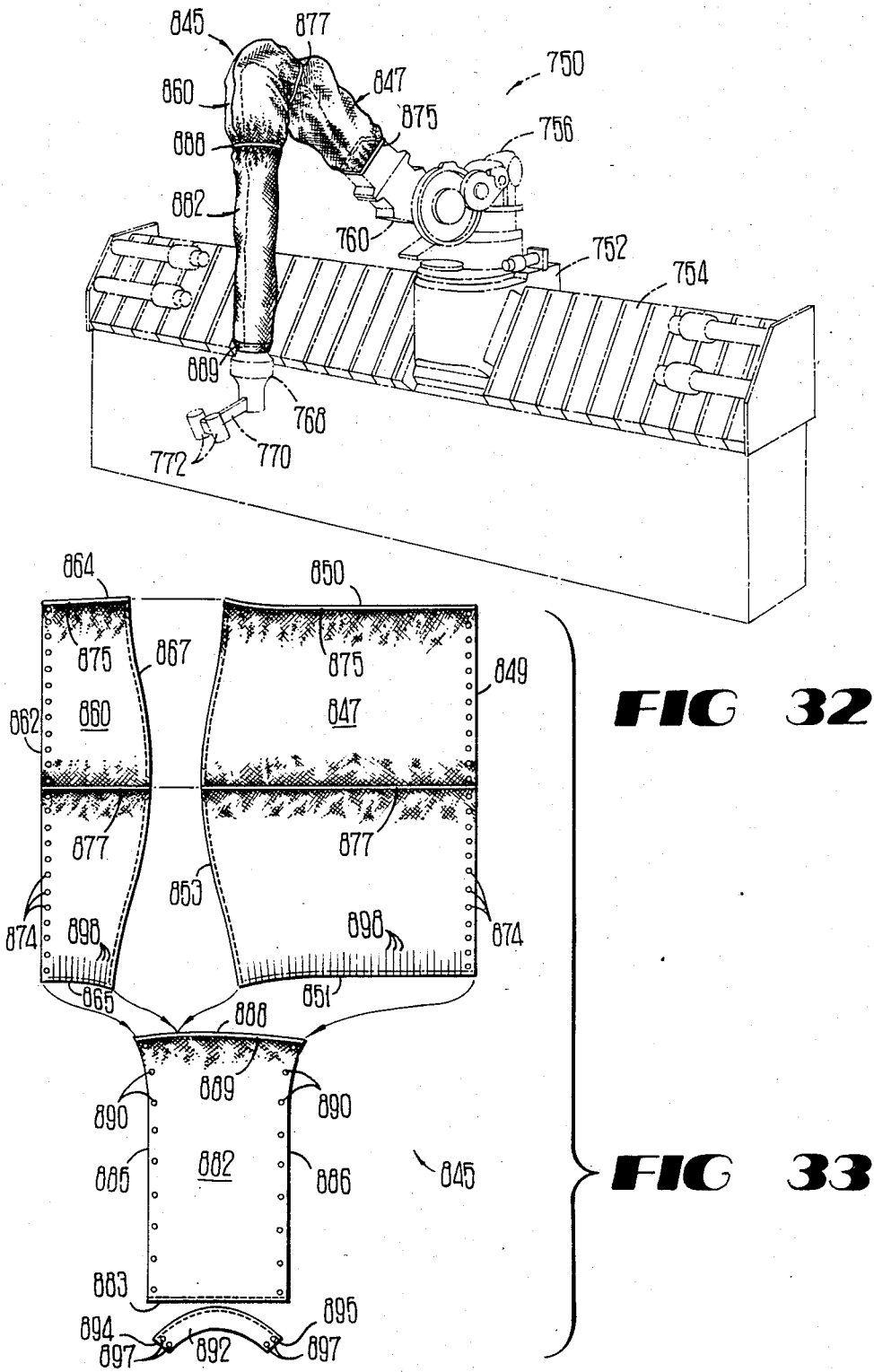

Turning to FIG. 32, an elbow and forearm cover 845 is shown assembled and mounted to the upper portion of the lower arm 758 and the upper arm 764. The elbow and forearm cover 845 is shown in FIG. 33 comprising a first panel 847. The first panel 847 has a straight side edge 849 and upper and lower edges 850 and 851 which extend from opposite ends of the straight side edge towards a contoured side edge 853. The upper and lower edges 850 and 851 flair slightly outwardly towards the contoured side edge 853. The contoured side edge 853 bulges slightly outwardly towards the center of the first panel 847. The elbow and forearm cover 845 also includes a second panel 860. The second panel 860 has a straight side edge 862 and upper and lower edges 864 and 865 which extend from opposite ends of the straight edge towards a contoured edge 867 opposite the straight side edge. The upper and lower edges 864 and 865 flair slightly outwardly towards the contoured side edge 867. The contoured side edge 867 bulges slightly outwardly at the center of the second panel 860. The contoured side edge 853 of the first panel 847 is sewn to the contoured side edge 867 of the second panel 860 so that the upper edge 850 of the first panel meets the upper edge 864 of the second panel and the lower edge 856 of the first panel meets the lower edge 865 of the second panel. The straight edges 849 and 862 are removably fastened with snaps 874.

A first elastic band 875 runs along the upper edges 850 and 864 of the first and second panels 847 and 860 respectively. A second elastic band 877 runs through the center of the elbow cover 750 between the edges 862 and 849.

The elbow and forearm cover 845 also comprises an elongated third panel 882 having a straight lower edge 883 and side edges 885 and 886 which extend upwardly from opposite ends of the lower edge towards a straight upper edge 888. The side edges 885 and 886 flair slightly outwardly towards the upper edge 888. An elastic band 889 runs along the upper edge 888. The side edges 885 and 886 are removably fastened together with snaps 890 which run along both edges. An arcuate strap 892 is sewn to the lower edge 883 of the third panel 882 along an upper edge 893 so that the opposite ends 894 and 895 meet the side edges 885 and 886 of the third panel respectively. The ends 894 and 895 of the arcuate strap 892 are removably fastened together with snaps 897. The lower edges 851 and 865 are pleated as shown by the vertical lines 898 in FIG. 33 and sewn to the upper edge 888 of the third panel so the side edges 849 and 862 meet the side edges 886 and 885 respectively.

The upper edges 850 and 864 of the first panel 847 and the second panel 860 are held tightly about the midsection of the lower arm 758 with the elastic band 875 so that the elbow and upper arm cover 845 slightly overlaps the shoulder cover 850. The straight edges 849 and 862 are fastened with the snaps 874 along the rearward side, as viewed in FIG. 32, of the upper arm 754 and the lower arm 758. The elbow and forearm cover 845 extends up and over the rearward end 766 of the upper arm 764 so that the seam created by the joined contoured edges 853 and 867 is positioned over the top of the upper arm 764 and the forward end 762 of the lower arm 758. The third panel 882 fits about the forward portion of the upper arm 764 so that the upper edge 888 of the third panel is held tightly about the rearward portion of the upper arm with the elastic band 889. The third panel 882 extends forward along the upper arm 764 to the wrist 768 where the snaps 897 in the arcuate strap 892 hold the elbow and forearm cover 845 tightly about the wrist. The snaps 890 fasten the side edges 885 and 886 along the rearward side, as viewed in FIG. 32, of the upper arm 764.

Figure 34:
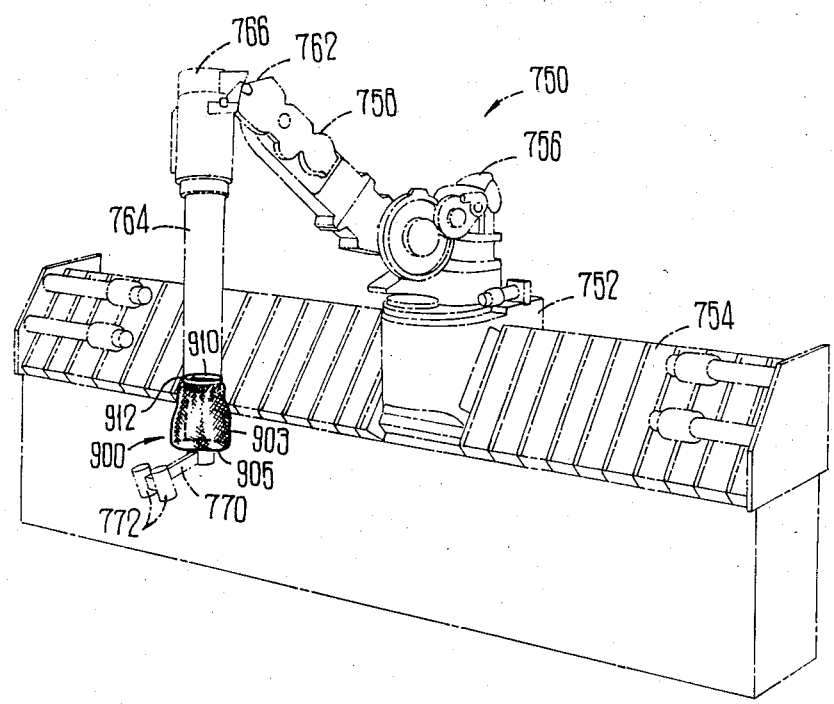
Figure 35:
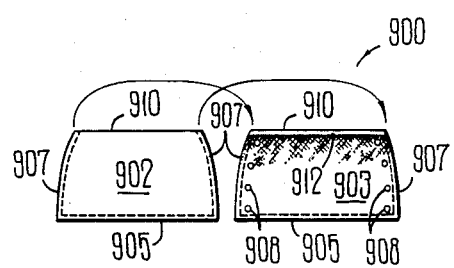

Turning to FIG. 34, a wrist cover 900 is shown assembled and mounted to the wrist 768. The wrist cover is shown in FIG. 35 generally comprising matching first and second panels 902 and 903. Each of the panels 902 and 903 have straight lower edges 905 and side edges 907 which bend slightly inwardly towards straight upper edges 910. An elastic band 912 runs along the upper edges 910 of the second panel 903. The first and second panels 902 and 903 are sewn together along the lower edges 905 and the side edges 907 to form a double layer wrist cover. The side edges 907 are removably fastened together with snaps 908 to form the bell-shaped wrist cover 900.

The upper edges 910 of the wrist cover 900 are held tightly about the lower portion of the upper arm 764 and the elbow and upper arm cover 845 with the elastic bands 912. The wrist cover 900 extends downwardly over the wrist 768 towards the paint spray nozzle 770.

Figure 36:
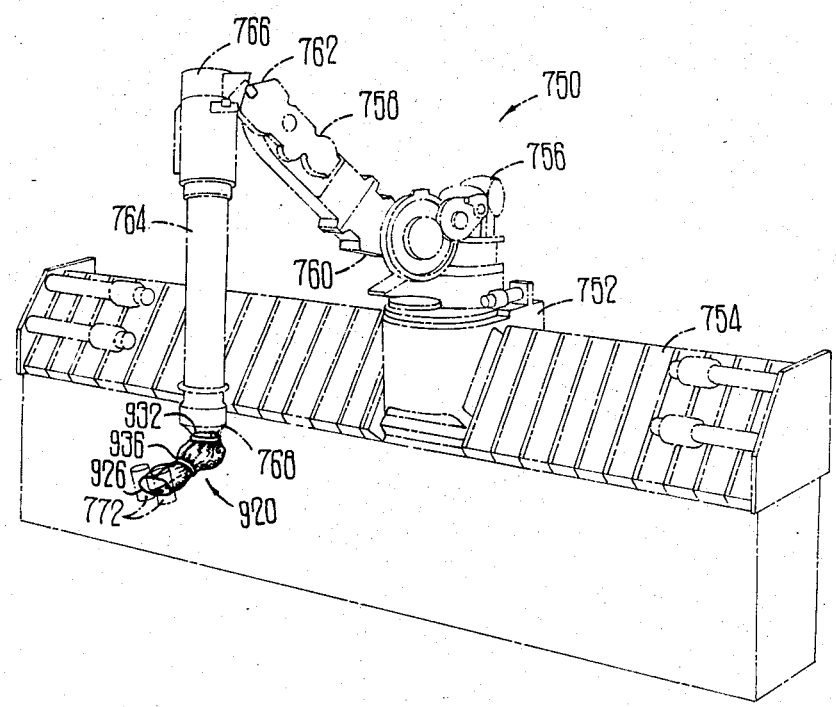
Figure 37:
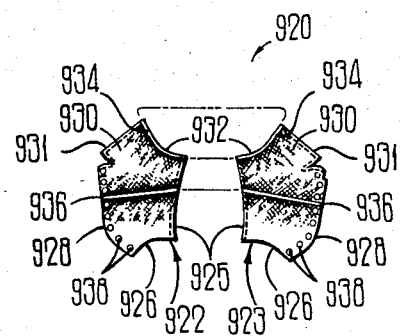

Turning to FIG. 36, a nozzle cover 920 is shown assembled and mounted to the nozzle 770. The nozzle cover 920 is shown in FIG. 37 comprising a pair of matching panels 922 and 923. Each of the panels 922 and 923 comprises an inner edge 925. A concave lower edge 926 extends from the lower end of the inner edge 925 towards an outer edge 928 which extends slightly outwardly and upwardly towards an upper portion 930. The upper portion 930 extends upwardly and inwardly along a straight edge 931 and then downwardly along a concave edge 932 towards the opposite end of the inner edge 925. A single elastic band 934 runs along each of the concave upper edges 932. Another single elastic band 936 runs through the midsection of each of the panels 922 and 923 between the outer edges 928. The inner edges 925 are sewn together and the straight edges 931 are sewn together to form the nozzle cover 920. The outer edges 928 are removably fastened together with snaps 938 along the outer edges.

The nozzle cover 920 fits snugly about the nozzle 770 as shown in FIG. 36. The elastic band 934 holds the upper portion 930 tightly about the lower portion of the wrist 768. The spray port 772 extends between the lower edges 926 of the panels 922 and 923. The snaps 938 are fastened along the bottom side of the nozzle 977. The elastic band 936 holds the nozzle cover tightly about the nozzle 770.

Figure 38:
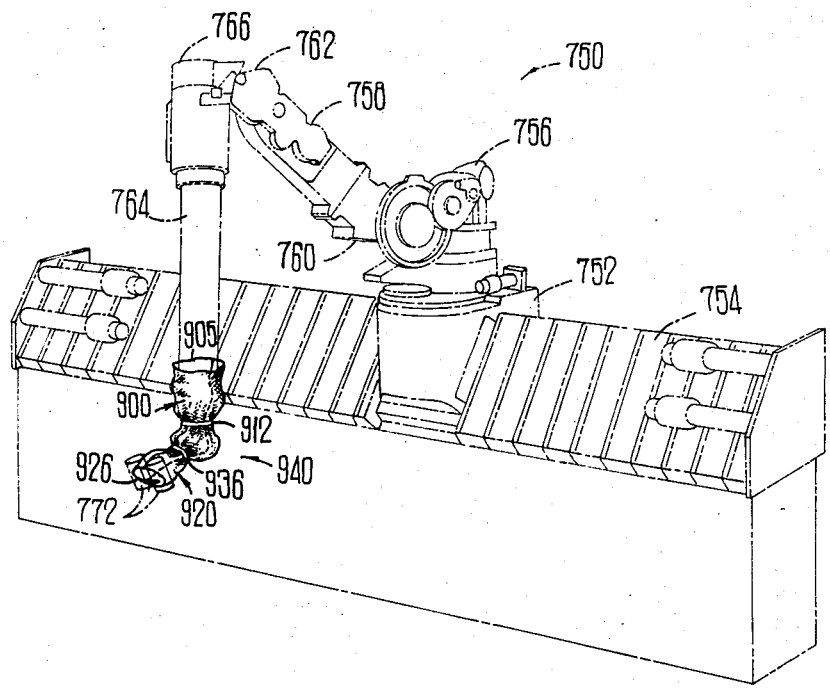
Figure 39:
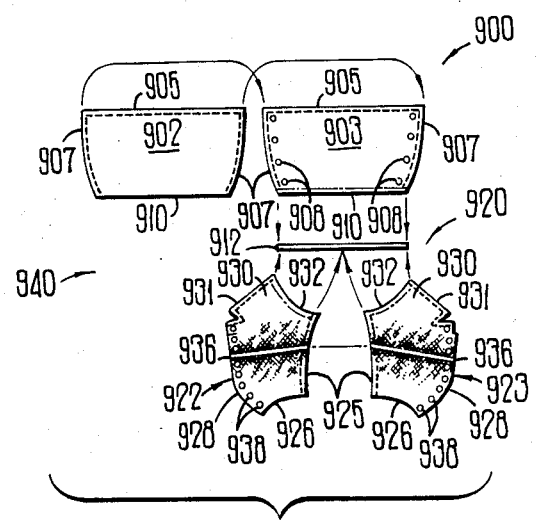

In an alternate embodiment 940 shown in FIGS. 38 and 39, the wrist cover 900 is inverted and sewn to the nozzle cover 920. The inverted upper edge 910 of the wrist cover 900 is sewn to the upper concave edges of the nozzle cover 920. A single elastic band 912 runs along the seam between the wrist cover 900 and the nozzle cover 920.

The nozzle cover 920 fits about the nozzle 770 as described previously and the wrist cover 900 extends from the elastic band 912 over the wrist 768 to the forward end of the upper arm 764. The edge 905 of the wrist cover fits under the forward portion of the elbow and upper arm cover 845.

Figure 40:
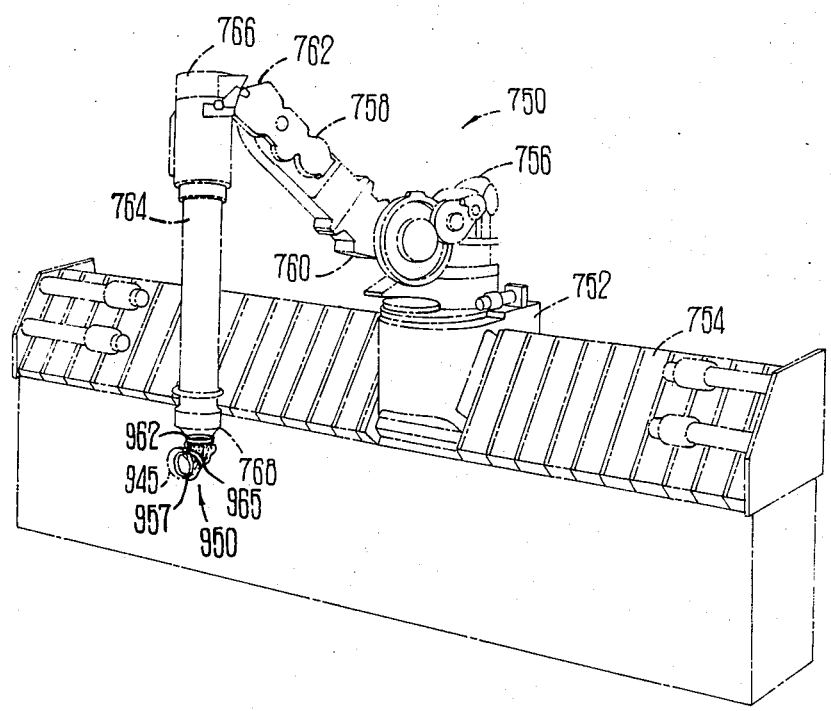
Figure 41:
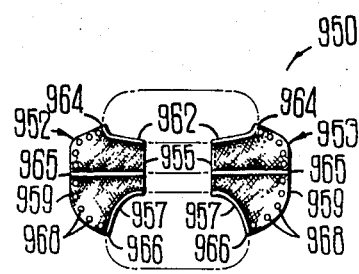

In another alternate embodiment, the GMF robot 750 has a disc-shaped spray port 945 as shown in phantom in FIG. 40. An alternate nozzle cover 950 for covering the nozzle leading to the disc-shaped spray port 945 is shown assembled and mounted to the nozzle in FIG. 40. The alternate nozzle cover 950 is shown in FIG. 41 comprising a pair of matching panels 952 and 953 each having an inner edge 955. A concave lower edge 957 extends from the lower end of the inner edge 955 towards the outer edge 959 which extends slightly outwardly and upwardly towards a concave upper edge 962. A single elastic band 964 runs along the concave upper edges 962. A second single elastic band 965 runs through the midsection of each of the panels 952 and 953 between the outer edges 959. A third elastic band 966 runs along the lower concave edge 957. The inner edges 955 are sewn together to form the alternate nozzle cover 950. The outer edges 955 are removably fastened together with snaps 968.

The alternate nozzle cover 950 fits snugly about the nozzle as shown in FIG. 40. The elastic band 964 holds the upper edge 962 about the lower portion of the wrist 768. The disc-shaped spray port 945 extends between the lower edges 957 of the panels 952 and 953. The snaps 968 are fastened along the bottom side of the nozzle. The elastic band 966 holds the lower edges 957 tightly about the forward end of the nozzle.

The base cover 755, the shoulder cover 805, the elbow and upper arm cover 845, the wrist cover 900, the nozzle cover 920, and the alternate nozzle cover 950 each preferably comprise the SMS laminate described herein, and, as with the previously described robot covers, each of the covers are individually replaceable so that each cover can be replaced separately when they become worn or caked with incident spray. Also, because these covers conform to the respective pieces of the GMF robot, the covers do not billow as the GMF robot operates and the likelihood of pieces of the incident spray caked on the outer surface of the covers and portions of the covers themselves detaching from the covers is substantially reduced.

It should be understood that the foregoing relates only to preferred embodiments of the present invention, and that numerous changes and modifications therein may be made without departing from the spirit and scope of the invention as defined in the following claims.

We claim:

1. Protective covering for a mechanical linkage comprising:
   a panel of non-woven fibrous, flexible material which is substantially impermeable to both liquid and particle contaminants, the panel conforming to the outer surface of the mechanical linkage so the protective covering does not billow as the mechanical linkage operates, thereby substantially reducing the detachment of contaminants and portions of the material from the protective covering.

2. Protective covering for a mechanical linkage as in claim 1, further comprising:
   an access opening whereby the mechanical linkage can be serviced without removing the protective covering from the mechanical linkage, thereby substantially reducing time required for repair and maintenance of the mechanical linkage.

3. Protective covering for a mechanical linkage as in claim 1, wherein:
   the panel of material comprises a three-layer non-woven fabric having a central layer of melt-blown polymeric fibers placed between and bonded to an outer layer of spunbonded polymeric fibers and an inner layer of spunbonded polymeric fibers.

4. Protective covering for a mechanical linkage as in claim 3, wherein:
   the outer layer is calendered so as to prevent linting.

5. Protective covering for a mechanical linkage as in claim 3, wherein:
   the outer layer has a bonding pattern whereby 25 to 30% of the outer layer is compressed so the outer layer resists abrasion.

6. Protective covering for a mechanical linkage as in claim 5, wherein:
   the bonding pattern comprises a plurality of compressions, each compression having an area substantially equal to about 0.0009 square inches.

7. Protective covering for a mechanical linkage as in claim 3, wherein:
   the outer layer comprises a fluorocarbon as a barrier to industrial coatings and finishes and an inorganic salt to prevent static electricity build-up on the outer layer.

8. Protective covering for a mechanical linkage as in claim 3, wherein:
   the polymeric fibers of the outer layer have a non-white color and the polymeric fibers of the inner layer have a color, the color of the polymeric fibers of the outer layer being visually distinguishable from the color of the polymeric fibers of the inner layer so the polymeric fibers of the outer layer are visually identifiable.

9. Protective covering for a mechanical linkage as in claim 3, further comprising:
   an access opening whereby the mechanical linkage can be serviced without removing the protective covering from the mechanical linkage, thereby substantially reducing time required for maintenance and repair of the mechanical linkage.

10. Protective covering for a mechanical linkage comprising:
    a plurality of sections of material which is substantially impermeable to both liquid and particle contaminants, the sections conforming to the outer surface of the mechanical linkage so the protective covering does not billow as the mechanical linkage operates, thereby substantially reducing the detachment of contaminants and portions of the material from the protective covering; and
    means for selectively fastening the sections about the mechanical linkage, and alternatively for removing the sections so the sections are individually replaceable.

11. Protective covering for a mechanical linkage as in claim 10, further comprising:
    an access opening whereby the mechanical linkage can be serviced without removing any of the sections from the mechanical linkage, thereby substantially reducing time required for repair and maintenance of the mechanical linkage.

12. Protective covering for a mechanical linkage as in claim 10, wherein:
    the sections of material comprise a three-layer non-woven fabric having a central layer of melt-blown polymeric fibers placed between and bonded to an outer layer of spunbonded polymeric fibers and an inner layer of spunbonded polymeric fibers.

13. Protective covering for a mechanical linkage as in claim 12, wherein:
    the outer layer is calendered so as to prevent linting.

14. Protective covering for a mechanical linkage as in claim 12, wherein:
the outer layer has a bonding pattern whereby 25 to 30% of the outer layer is compressed so the outer layer resists abrasion.

15. Protective covering for a mechanical linkage as in claim 14, wherein:
the bonding pattern comprises a plurality of compressions, each compression having an area substantially equal to about 0.0009 square inches.

16. Protective covering for a mechanical linkage as in claim 12, wherein:
the outer layer comprises a fluorocarbon as a barrier to industrial coatings and finishes and an inorganic salt to prevent static electricity build-up on the outer layer.

17. Protective covering for a mechanical linkage as in claim 12, wherein:
the polymeric fibers of the outer layer have a non-white color and the polymeric fibers of the inner layer have a color, the color of the polymeric fibers of the outer layer being visually distinguishable from the color of the polymeric fibers of the inner layer so the polymeric fibers of the outer layer are visually identifiable.

18. Protective covering for a mechanical linkage as in claim 12, further comprising:
an access opening whereby the mechanical linkage can be serviced without removing any of the sections from the mechanical linkage, thereby substantially reducing time required for maintenance and repair of the mechanical linkage.

19. Protective covering for a mechanical linkage having two rigid members and a pivot, the protective covering comprising:
two cover sections, one for covering each rigid member, the cover sections comprising non-woven fibrous, flexible material which is substantially impermeable to liquid and particle contaminants and the cover sections conforming to the outer surface of the respective rigid members so the cover sections do not billow as the mechanical linkage operates, thereby substantially reducing the detachment of contaminants and portions of the material from the protected covering.

20. Protective covering for a mechanical linkage as in claim 19, wherein:
one of the two cover sections has an access opening whereby the mechanical linkage can be serviced without removing the protective covering from the mechanical linkage, thereby substantially reducing time required for maintenance and repair of the mechanical linkage.

21. Protective covering for a mechanical linkage as in claim 19, wherein:
the cover sections each comprise a three-layer non-woven fabric having a central layer of melt-blown polymeric fibers placed between and bonded to an outer layer of spunbonded polymeric fibers and an inner layer of spunbonded polymeric fibers.

22. Protective covering for a mechanical linkage as in claim 21, wherein:
the outer layer is calendered so as to prevent linting.

23. Protective covering for a mechanical linkage as in claim 21, wherein:
the outer layer has a bonding pattern whereby 25 to 30% of the outer layer is compressed so the outer layer resists abrasion.

24. Protective covering for a mechanical linkage as in claim 23, wherein:
the bonding pattern comprises a plurality of compressions, each compression having an area substantially equal to about 0.0009 square inches.

25. Protective covering for a mechanical linkage as in claim 21, wherein:
the outer layer comprises a fluorocarbon as a barrier to industrial coatings and finishes and an inorganic salt to prevent static electricity build-up on the outer layer.

26. Protective covering for a mechanical linkage as in claim 21, wherein:
the polymeric fibers of the outer layer have a non-white color and the polymeric fibers of the inner layer have a color, the color of the polymeric fibers of the outer layer being visually distinguishable from the color of the polymeric fibers of the inner layer so the polymeric fibers of the outer layer are visually identifiable.

27. Protective covering for a mechanical linkage as in claim 21, wherein:
one of the two cover sections has an access opening whereby the mechanical linkage can be serviced without removing the protective covering from the mechanical linkage, thereby substantially reducing time required for maintenance and repair of the mechanical linkage.

28. Protective covering for a robot having a base, a first arm and a second arm, the protective covering comprising:
a base cover for covering the base;
a first arm cover for covering the first arm;
a second arm cover for covering the second arm;
the base cover, the first arm cover, and the second arm cover each comprising non-woven fibrous, flexible material which is substantially impermeable to liquid and particle contaminants;
the base cover, the first arm cover, and the second arm cover each conforming to the outer surface of the base, the first arm, and the second arm respectively so the base cover, the first arm cover and the second arm cover do not billow as the robot operates, thereby substantially reducing the detachment of contaminants and portions of the material from the protective covering; and
means for selectively fastening the base cover, the first arm cover, and the second arm cover about the base, the first arm, and the second arm respectively and alternatively for removing the base cover, the first arm cover, and the second arm cover so the base cover, the first arm cover, and the second arm cover are individually replaceable.

29. Protective covering for a robot as in claim 28, wherein:
the base cover has an access opening whereby the robot can be serviced without removing the protective covering from the mechanical linkage, thereby substantially reducing time required for maintenance and repair of the mechanical linkage.

30. Protective covering for a robot as in claim 28, wherein:
the base cover, the first arm cover, and the second arm cover each comprise a three-layer non-woven fabric having a central layer of melt-blown polymeric fibers placed between the bonded to an outer layer of spunbonded polymeric fibers and an inner layer of spunbonded polymeric fibers.

31. Protective covering for a robot as in claim 30, wherein:

the outer layer is calendered so as to prevent linting.

32. Protective covering for a robot as in claim 30, wherein:

the outer layer has a bonding pattern whereby 25 to 30% of the outer layer is compressed so the outer layer resists abrasion.

33. Protective covering for a robot as in claim 32, wherein:

the bonding pattern comprises a plurality of compressions, each compression having an area substantially equal to about 0.0009 square inches.

34. Protective covering for a robot as in claim 30, further comprising:

the outer layer comprises a fluorocarbon as a barrier to industrial coatings and finishes and an inorganic salt to prevent static electricity build-up on the outer layer.

35. Protective covering for a robot as in claim 30, wherein:

the polymeric fibers of the outer layer have a non-white color and the polymeric fibers of the inner layer have a color, the color of the polymeric fibers of the outer layer being visually distinguishable from the color of the polymeric fibers of the inner layer so the polymeric fibers of the outer layer are visually identifiable.

36. Protective covering for a robot as in claim 30, wherein:

the base cover has an access opening whereby the robot can be serviced without removing the protective covering from the mechanical linkage, thereby substantially reducing time required for maintenance and repair of the mechanical linkage.

* * * * *

UNITED STATES PATENT AND TRADEMARK OFFICE
CERTIFICATE OF CORRECTION

PATENT NO. : 4,904,514
DATED : 2/27/90
INVENTOR(S) : Robert A. Morrison, Malcolm L. Johnson It is certified that error appears in the above—identified patent and that said Letters Patent is hereby corrected as shown below:

Column 2, line 3 change "conforming" to --conforms--.

Column 4, line 12 change "Minneapolis" to --St. Paul--.

Column 7, line 26 change "Derivation" to --Deviation--.
   line 43 change "u" to --$\mu$--.
   line 59 change "Derivation" to --Deviation--.

Column 8 line 12 change "u" to --$\mu$--.

Column 20 line 30 change "30" to --31--.

Signed and Sealed this

Sixth Day of August, 1991

Attest:

HARRY F. MANBECK, JR.

Attesting Officer

Commissioner of Patents and Trademarks